(12) United States Patent
Todeschini

(10) Patent No.: US 10,094,650 B2
(45) Date of Patent: Oct. 9, 2018

(54) DIMENSIONING AND IMAGING ITEMS

(71) Applicant: Hand Held Products, Inc., Fort Mill, SC (US)

(72) Inventor: Erik Todeschini, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 398 days.

(21) Appl. No.: 14/800,757

(22) Filed: Jul. 16, 2015

(65) Prior Publication Data

US 2017/0018094 A1 Jan. 19, 2017

(51) Int. Cl.
*G01B 11/00* (2006.01)
*G01B 11/24* (2006.01)
*G01B 11/02* (2006.01)
*H04N 13/02* (2006.01)

(52) U.S. Cl.
CPC ............ *G01B 11/002* (2013.01); *G01B 11/00* (2013.01); *G01B 11/022* (2013.01); *G01B 11/24* (2013.01); *H04N 13/0203* (2013.01); *G06T 2200/04* (2013.01); *G06T 2219/012* (2013.01)

(58) Field of Classification Search
None
See application file for complete search history.

(56) References Cited

U.S. PATENT DOCUMENTS

| 3,971,065 | A | 7/1976 | Bayer |
|---|---|---|---|
| 4,026,031 | A | 5/1977 | Siddall et al. |
| 4,279,328 | A | 7/1981 | Ahlbom |
| 4,398,811 | A | 8/1983 | Nishioka et al. |
| 4,495,559 | A | 1/1985 | Gelatt, Jr. |
| 4,730,190 | A | 3/1988 | Win et al. |
| 4,803,639 | A | 2/1989 | Steele et al. |
| 5,175,601 | A | 12/1992 | Fitts |
| 5,184,733 | A | 2/1993 | Amarson et al. |
| 5,198,648 | A | 3/1993 | Hibbard |

(Continued)

FOREIGN PATENT DOCUMENTS

AU    2004212587 A1    4/2005
CN    201139117 Y    10/2008

(Continued)

OTHER PUBLICATIONS

U.S. Appl. No. 13/367,978, filed Feb. 7, 2012, (Feng et al.); now abandoned.

(Continued)

*Primary Examiner* — William C Vaughn, Jr.
*Assistant Examiner* — Lindsay Uhl
(74) *Attorney, Agent, or Firm* — Additon, Higgins & Pendleton, P.A.

(57) ABSTRACT

Methods for dimensioning a 3D item are described. A FOV is mapped over three spatial dimensions, each of the three spatial dimensions oriented orthogonally in relation to each of the others and graduated according to a linear scale. The 3D item is scanned relative to the mapped FOV. Each of the 2D surfaces of the scanned 3D item is identified. A dimension is measured for each of the identified 2D surfaces of the scanned 3D item. A perspective-correct representation of the measured dimension is rendered, in real time or near real time, with respect to the measuring the dimension step, onto each of the identified 2D surfaces of the scanned 3D item.

16 Claims, 7 Drawing Sheets

(56) References Cited

U.S. PATENT DOCUMENTS

| | | |
|---|---|---|
| 5,220,536 A | 6/1993 | Stringer et al. |
| 5,331,118 A | 7/1994 | Jensen |
| 5,359,185 A | 10/1994 | Hanson |
| 5,384,901 A | 1/1995 | Glassner et al. |
| 5,548,707 A | 8/1996 | LoNegro et al. |
| 5,555,090 A | 9/1996 | Schmutz |
| 5,561,526 A | 10/1996 | Huber et al. |
| 5,590,060 A | 12/1996 | Granville et al. |
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,748,199 A | 5/1998 | Palm |
| 5,767,962 A | 6/1998 | Suzuki et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim et al. |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,035,067 A | 3/2000 | Ponticos |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,115,114 A | 9/2000 | Berg et al. |
| 6,137,577 A | 10/2000 | Woodworth |
| 6,177,999 B1 | 1/2001 | Wurz et al. |
| 6,189,223 B1 | 2/2001 | Haug |
| 6,232,597 B1 | 5/2001 | Kley |
| 6,236,403 B1 | 5/2001 | Chaki |
| 6,246,468 B1 | 6/2001 | Dimsdale |
| 6,333,749 B1 | 12/2001 | Reinhardt et al. |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D'Hooge et al. |
| 6,535,776 B1 | 3/2003 | Tobin et al. |
| 6,661,521 B1 | 12/2003 | Stern |
| 6,674,904 B1 | 1/2004 | McQueen |
| 6,705,526 B1 | 3/2004 | Zhu et al. |
| 6,781,621 B1 | 8/2004 | Gobush et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,922,632 B2 | 7/2005 | Foxlin |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Zhu et al. |
| 7,137,556 B1 | 11/2006 | Bonner et al. |
| 7,159,783 B2 | 1/2007 | Walczyk et al. |
| 7,161,688 B1 | 1/2007 | Bonner et al. |
| 7,205,529 B2 | 4/2007 | Andersen et al. |
| 7,214,954 B2 | 5/2007 | Schopp |
| 7,277,187 B2 | 10/2007 | Smith et al. |
| 7,307,653 B2 | 12/2007 | Dutta |
| 7,310,431 B2 | 12/2007 | Gokturk et al. |
| 7,353,137 B2 | 4/2008 | Vock et al. |
| 7,413,127 B2 | 8/2008 | Ehrhart et al. |
| 7,509,529 B2 | 3/2009 | Colucci et al. |
| 7,527,205 B2 | 5/2009 | Zhu |
| 7,586,049 B2 | 9/2009 | Wurz |
| 7,602,404 B1 | 10/2009 | Reinhardt et al. |
| 7,614,563 B1 | 11/2009 | Nunnink et al. |
| 7,639,722 B1 | 12/2009 | Paxton et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,974,025 B2 | 7/2011 | Topliss |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,061,610 B2 | 11/2011 | Nunnink |
| 8,072,581 B1 | 12/2011 | Breiholz |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,201,737 B1 | 6/2012 | Palacios Durazo et al. |
| 8,212,158 B2 | 7/2012 | Wiest |
| 8,212,889 B2 | 7/2012 | Chanas et al. |
| 8,228,510 B2 | 7/2012 | Pangrazio et al. |
| 8,230,367 B2 | 7/2012 | Bell et al. |
| 8,294,969 B2 | 10/2012 | Plesko |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,322,622 B2 | 12/2012 | Liu |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,366,005 B2 | 2/2013 | Kotlarsky et al. |
| 8,371,507 B2 | 2/2013 | Haggerty et al. |
| 8,374,498 B2 | 2/2013 | Pastore |
| 8,376,233 B2 | 2/2013 | Horn et al. |
| 8,381,976 B2 | 2/2013 | Mohideen et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |

(56) References Cited

U.S. PATENT DOCUMENTS

| | | |
|---|---|---|
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,594,425 B2 | 11/2013 | Gurman et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1 | 8/2014 | Hilde |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,897,596 B1 | 11/2014 | Passmore et al. |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,928,896 B2 | 1/2015 | Kennington et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,014,441 B2 | 4/2015 | Truyen et al. |
| 9,015,513 B2 | 4/2015 | Murawski et al. |
| 9,016,576 B2 | 4/2015 | Brady et al. |
| D730,357 S | 5/2015 | Fitch et al. |

(56) References Cited

U.S. PATENT DOCUMENTS

| | | |
|---|---|---|
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,082,195 B2 | 7/2015 | Holeva et al. |
| 9,142,035 B1 | 9/2015 | Rotman et al. |
| 9,171,278 B1 | 10/2015 | Kong et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,233,470 B1 | 1/2016 | Bradski et al. |
| 9,235,899 B1 | 1/2016 | Kirmani et al. |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,299,013 B1 | 3/2016 | Curlander et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| 9,424,749 B1 | 8/2016 | Reed et al. |
| D766,244 S | 9/2016 | Zhou et al. |
| 9,443,222 B2 | 9/2016 | Singel et al. |
| 9,478,113 B2 | 10/2016 | Xie et al. |
| 9,486,921 B1 | 11/2016 | Straszheim et al. |
| 9,828,223 B2 | 11/2017 | Svensson et al. |
| 2001/0027995 A1 | 10/2001 | Patel et al. |
| 2001/0032879 A1 | 10/2001 | He |
| 2002/0036765 A1 | 3/2002 | McCaffrey et al. |
| 2002/0054289 A1 | 5/2002 | Thibault et al. |
| 2002/0067855 A1 | 6/2002 | Chiu et al. |
| 2002/0105639 A1 | 8/2002 | Roelke |
| 2002/0109835 A1 | 8/2002 | Goetz |
| 2002/0113946 A1 | 8/2002 | Kitaguchi et al. |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0078755 A1 | 4/2003 | Leutz et al. |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0132297 A1 | 7/2004 | Baba et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128193 A1 | 6/2005 | Popescu et al. |
| 2005/0128196 A1 | 6/2005 | Popescu et al. |
| 2005/0168488 A1 | 8/2005 | Montague |
| 2005/0211782 A1 | 9/2005 | Martin |
| 2005/0257748 A1 | 11/2005 | Kriesel et al. |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0109105 A1 | 5/2006 | Varner et al. |
| 2006/0112023 A1 | 5/2006 | Horhann |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0213999 A1 | 9/2006 | Wang et al. |
| 2006/0230640 A1 | 10/2006 | Chen |
| 2006/0232681 A1 | 10/2006 | Okada |
| 2006/0255150 A1 | 11/2006 | Longacre |
| 2006/0269165 A1 | 11/2006 | Viswanathan |
| 2006/0276709 A1 | 12/2006 | Khamene et al. |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0047760 A1 | 2/2008 | Georgitsis |
| 2008/0050042 A1 | 2/2008 | Zhang et al. |
| 2008/0056536 A1 | 3/2008 | Hildreth et al. |
| 2008/0062164 A1 | 3/2008 | Bassi et al. |
| 2008/0077265 A1 | 3/2008 | Boyden |
| 2008/0079955 A1 | 4/2008 | Storm |
| 2008/0164074 A1 | 6/2008 | Wurz |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0038182 A1 | 2/2009 | Lans et al. |

(56) References Cited

U.S. PATENT DOCUMENTS

| | | |
|---|---|---|
| 2009/0059004 A1 | 3/2009 | Bochicchio |
| 2009/0081008 A1 | 3/2009 | Somin et al. |
| 2009/0095047 A1 | 4/2009 | Patel et al. |
| 2009/0134221 A1 | 5/2009 | Zhu et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0199232 A1* | 8/2010 | Mistry .................. G06F 1/163 715/863 |
| 2010/0202702 A1 | 8/2010 | Benos et al. |
| 2010/0208039 A1 | 8/2010 | Stellner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Amz |
| 2010/0274728 A1 | 10/2010 | Kugelman |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0040407 A1 | 2/2011 | Lim |
| 2011/0043609 A1 | 2/2011 | Choi et al. |
| 2011/0075936 A1 | 3/2011 | Deaver |
| 2011/0081044 A1 | 4/2011 | Peeper et al. |
| 2011/0099474 A1 | 4/2011 | Grossman et al. |
| 2011/0169999 A1 | 7/2011 | Grunow et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0260965 A1 | 10/2011 | Kim et al. |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0297590 A1 | 12/2011 | Ackley et al. |
| 2011/0301994 A1 | 12/2011 | Tieman |
| 2011/0303748 A1 | 12/2011 | Lemma et al. |
| 2011/0310227 A1 | 12/2011 | Konertz et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0126000 A1 | 5/2012 | Kunzig et al. |
| 2012/0140300 A1 | 6/2012 | Freeman |
| 2012/0168509 A1 | 7/2012 | Nunnink et al. |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 9/2012 | Rodriguez et al. |
| 2012/0223141 A1 | 9/2012 | Good et al. |
| 2012/0224026 A1 | 9/2012 | Bayer et al. |
| 2012/0224060 A1 | 9/2012 | Gurevich et al. |
| 2012/0236288 A1 | 9/2012 | Stanley |
| 2012/0242852 A1 | 9/2012 | Hayward et al. |
| 2012/0113250 A1 | 10/2012 | Farlotti et al. |
| 2012/0256901 A1 | 10/2012 | Bendall |
| 2012/0261474 A1 | 10/2012 | Kawashime et al. |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294549 A1 | 11/2012 | Doepke |
| 2012/0299961 A1 | 11/2012 | Ramkumar et al. |
| 2012/0300991 A1 | 11/2012 | Mikio |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0314222 A1* | 12/2012 | Stone .................. B07C 5/04 356/601 |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0075168 A1 | 3/2013 | Amundsen et al. |
| 2013/0093895 A1 | 4/2013 | Palmer et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0201288 A1 | 8/2013 | Billerbaeck et al. |
| 2013/0208164 A1 | 8/2013 | Cazier et al. |
| 2013/0211790 A1 | 8/2013 | Loveland et al. |
| 2013/0222592 A1 | 8/2013 | Gieseke |
| 2013/0223673 A1 | 8/2013 | Davis et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0329012 A1 | 12/2013 | Bartos |
| 2013/0329013 A1 | 12/2013 | Metois et al. |
| 2013/0342342 A1 | 12/2013 | Sabre et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0009586 A1 | 1/2014 | McNamer et al. |

(56) References Cited

U.S. PATENT DOCUMENTS

| | | |
|---|---|---|
| 2014/0019005 A1 | 1/2014 | Lee et al. |
| 2014/0021259 A1* | 1/2014 | Moed .................. G06K 9/2027 235/472.01 |
| 2014/0025584 A1 | 1/2014 | Liu et al. |
| 2014/0031665 A1 | 1/2014 | Pinto et al. |
| 2014/0100813 A1 | 1/2014 | Showering |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039674 A1 | 2/2014 | Motoyama et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0064624 A1 | 3/2014 | Kim et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0079297 A1 | 3/2014 | Tadayon et al. |
| 2014/0091147 A1 | 4/2014 | Evans et al. |
| 2014/0097238 A1 | 4/2014 | Ghazizadeh |
| 2014/0098091 A1 | 4/2014 | Hori |
| 2014/0098243 A1 | 4/2014 | Ghazizadeh |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0104664 A1 | 4/2014 | Lee |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Takahashi |
| 2014/0140585 A1 | 5/2014 | Wang |
| 2014/0142398 A1 | 5/2014 | Patil et al. |
| 2014/0151453 A1 | 6/2014 | Meier et al. |
| 2014/0152882 A1 | 6/2014 | Samek et al. |
| 2014/0152975 A1 | 6/2014 | Ko |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0177931 A1 | 6/2014 | Kocherscheidt et al. |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0201126 A1 | 7/2014 | Zadeh et al. |
| 2014/0203087 A1 | 7/2014 | Smith et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0232930 A1 | 8/2014 | Anderson |
| 2014/0240454 A1 | 8/2014 | Lee |
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1 | 9/2014 | Tohme et al. |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0306833 A1 | 10/2014 | Ricci |
| 2014/0307855 A1 | 10/2014 | Withagen et al. |
| 2014/0312121 A1 | 10/2014 | Lu et al. |
| 2014/0313527 A1 | 10/2014 | Askan |
| 2014/0319219 A1 | 10/2014 | Liu et al. |
| 2014/0319220 A1 | 10/2014 | Coyle |
| 2014/0319221 A1 | 10/2014 | Oberpriller et al. |
| 2014/0320408 A1 | 10/2014 | Zagorsek et al. |
| 2014/0326787 A1 | 11/2014 | Barten |
| 2014/0332590 A1 | 11/2014 | Wang et al. |
| 2014/0333775 A1 | 11/2014 | Naikal et al. |
| 2014/0344943 A1 | 11/2014 | Todeschini et al. |
| 2014/0346233 A1 | 11/2014 | Liu et al. |
| 2014/0347533 A1 | 11/2014 | Ovsiannikov et al. |
| 2014/0350710 A1 | 11/2014 | Gopalkrishnan et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1 | 12/2014 | Nishitani et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |

(56) References Cited

U.S. PATENT DOCUMENTS

| | | |
|---|---|---|
| 2015/0029002 A1 | 1/2015 | Yeakley et al. |
| 2015/0032709 A1 | 1/2015 | Maloy et al. |
| 2015/0036876 A1 | 2/2015 | Marrion et al. |
| 2015/0039309 A1 | 2/2015 | Braho et al. |
| 2015/0040378 A1 | 2/2015 | Saber et al. |
| 2015/0042791 A1 | 2/2015 | Metois et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062160 A1 | 3/2015 | Sakamoto et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0070158 A1 | 3/2015 | Hayasaka |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0116498 A1 | 4/2015 | Vartiainen et al. |
| 2015/0117749 A1 | 4/2015 | Chen et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0163474 A1 | 6/2015 | You |
| 2015/0169925 A1 | 6/2015 | Chang et al. |
| 2015/0169929 A1 | 6/2015 | Williams et al. |
| 2015/0178900 A1 | 6/2015 | Kim et al. |
| 2015/0182844 A1 | 7/2015 | Jang |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0201181 A1 | 7/2015 | Moore et al. |
| 2015/0204662 A1 | 7/2015 | Kobayashi et al. |
| 2015/0204671 A1 | 7/2015 | Showering |
| 2015/0210199 A1 | 7/2015 | Payne |
| 2015/0213647 A1 | 7/2015 | Laffargue et al. |
| 2015/0219748 A1 | 8/2015 | Hyatt |
| 2015/0220753 A1 | 8/2015 | Zhu et al. |
| 2015/0229838 A1 | 8/2015 | Hakim et al. |
| 2015/0254485 A1 | 9/2015 | Feng et al. |
| 2015/0269403 A1 | 9/2015 | Lei et al. |
| 2015/0276379 A1 | 10/2015 | Ni et al. |
| 2015/0308816 A1 | 10/2015 | Laffargue et al. |
| 2015/0316368 A1 | 11/2015 | Moench et al. |
| 2015/0325036 A1 | 11/2015 | Lee |
| 2015/0327012 A1 | 11/2015 | Bian et al. |
| 2015/0332463 A1 | 11/2015 | Galera et al. |
| 2015/0355470 A1 | 12/2015 | Herschbach |
| 2016/0014251 A1 | 1/2016 | Hejl |
| 2016/0169665 A1 | 1/2016 | Deschenes et al. |
| 2016/0040982 A1 | 2/2016 | Li et al. |
| 2016/0042241 A1 | 2/2016 | Todeschini |
| 2016/0048725 A1 | 2/2016 | Holz et al. |
| 2016/0057230 A1 | 2/2016 | Todeschini et al. |
| 2016/0070982 A1 | 2/2016 | Li et al. |
| 2016/0063429 A1 | 3/2016 | Varley et al. |
| 2016/0065912 A1 | 3/2016 | Peterson |
| 2016/0088287 A1 | 3/2016 | Sadi et al. |
| 2016/0090283 A1 | 3/2016 | Svensson et al. |
| 2016/0090284 A1 | 3/2016 | Svensson et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0187186 A1 | 6/2016 | Coleman et al. |
| 2016/0187187 A1 | 6/2016 | Coleman et al. |
| 2016/0187210 A1 | 6/2016 | Coleman et al. |
| 2016/0189087 A1 | 6/2016 | Morton et al. |
| 2016/0191801 A1 | 6/2016 | Sivan |
| 2016/0125873 A1 | 7/2016 | Braho et al. |
| 2016/0202478 A1 | 7/2016 | Masson et al. |
| 2016/0203641 A1 | 7/2016 | Bostick et al. |
| 2016/0223474 A1 | 8/2016 | Tang et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0343176 A1 | 11/2016 | Ackley |
| 2017/0115490 A1 | 4/2017 | Hsieh et al. |
| 2017/0121158 A1 | 5/2017 | Wong |
| 2017/0336870 A1 | 11/2017 | Everett et al. |

FOREIGN PATENT DOCUMENTS

| | | |
|---|---|---|
| DE | 3335760 A1 | 4/1985 |
| DE | 10210813 A1 | 10/2003 |
| DE | 102007037282 A1 | 3/2008 |
| EP | 1111435 A2 | 6/2001 |
| EP | 1443312 A1 | 8/2004 |
| EP | 1112483 B1 | 5/2006 |
| EP | 1232480 B1 | 5/2006 |
| EP | 2013117 A1 | 1/2009 |
| EP | 2286932 A2 | 2/2011 |
| EP | 2372648 A2 | 10/2011 |
| EP | 2381421 A2 | 10/2011 |
| EP | 2533009 A1 | 12/2012 |
| EP | 2562715 A1 | 2/2013 |
| EP | 2722656 A1 | 4/2014 |
| EP | 2779027 A1 | 9/2014 |
| EP | 2833323 A2 | 2/2015 |
| EP | 2843590 A2 | 3/2015 |
| EP | 2845170 A1 | 3/2015 |
| EP | 2966595 A1 | 1/2016 |
| EP | 3006893 A1 | 3/2016 |
| EP | 3012601 A1 | 3/2016 |
| EP | 3007096 A1 | 4/2016 |
| GB | 2503978 A1 | 1/2014 |
| GB | 2525053 A | 10/2015 |
| GB | 2531928 A | 5/2016 |
| JP | H04129902 A | 4/1992 |
| JP | 200696457 A | 4/2006 |
| JP | 2007084162 A | 4/2007 |
| JP | 2008210276 A | 9/2008 |
| JP | 2014210646 A | 11/2014 |
| JP | 2015174705 A | 10/2015 |

(56) References Cited

FOREIGN PATENT DOCUMENTS

| | | |
|---|---|---|
| KR | 20100020115 A | 2/2010 |
| KR | 20110013200 A | 2/2011 |
| KR | 20110117020 A | 10/2011 |
| KR | 20120028109 A | 3/2012 |
| WO | 96/40452 A1 | 12/1996 |
| WO | 0077726 A1 | 12/2000 |
| WO | 0114836 A1 | 3/2001 |
| WO | 2006095110 A1 | 9/2006 |
| WO | 2007015059 A1 | 2/2007 |
| WO | 200712554 A1 | 11/2007 |
| WO | 2011017241 A1 | 2/2011 |
| WO | 2012175731 A1 | 12/2012 |
| WO | 2013021157 A1 | 2/2013 |
| WO | 2013033442 A1 | 3/2013 |
| WO | 2013163789 A1 | 11/2013 |
| WO | 2013166368 A1 | 11/2013 |
| WO | 2013173985 A1 | 11/2013 |
| WO | 2013018340 A1 | 12/2013 |
| WO | 2014019130 A1 | 2/2014 |
| WO | 2014023697 A1 | 2/2014 |
| WO | 2014102341 A1 | 7/2014 |
| WO | 2014110495 A1 | 7/2014 |
| WO | 2014149702 A1 | 9/2014 |
| WO | 2014151746 A1 | 9/2014 |
| WO | 2015006865 A1 | 1/2015 |
| WO | WO 2015006865 A1 * 1/2015 ......... G01N 21/8806 |
| WO | 2016020038 A1 | 2/2016 |
| WO | 2016061699 | 4/2016 |
| WO | 2016061699 A1 | 4/2016 |

OTHER PUBLICATIONS

U.S. Appl. No. 14/462,801 for Mobile Computing Device With Data Cognition Software, filed Aug. 19, 2014 (Todeschini et al.); 38 pages.
U.S. Appl. No. 14/596,757 for System and Method for Detecting Barcode Printing Errors filed Jan. 14, 2015 (Ackley); 41 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications filed Mar. 7, 2014 (Feng et al.); 42 pages.
U.S. Appl. No. 14/662,922 for Multifunction Point of Sale System filed Mar. 19, 2015 (Van Horn et al.); 41 pages.
U.S. Appl. No. 14/446,391 for Multifunction Point of Sale Apparatus With Optical Signature Capture filed Jul. 30, 2014 (Good et al.); 37 pages.
U.S. Appl. No. 29/528,165 for In-Counter Barcode Scanner filed May 27, 2015 (Oberpriller et al.); 13 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.

U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 2014 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for CYCLONE filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.

(56) References Cited

OTHER PUBLICATIONS

U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
U.S. Appl. No. 14/277,337 for Multipurpose Optical Reader, filed May 14, 2014 (Jovanovski et 31); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 14/283,282 for Terminal Having Illumination and Focus Control filed May 21, 2014 (Liu et al.); 31 pages; now abandoned.
U.S. Appl. No. 14/702,110 for System and Method for Regulating Barcode Data Injection Into a Running Application on a Smart Device filed May 1, 2015 (Todeschini et al.); 38 pages.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
McCloskey et al., "Image Transformation for Indicia Reading," U.S. Appl. No. 14/928,032, filed Oct. 30, 2015, 48 pages, not yet published.
Great Britain Combined Search and Examination Report in related Application GB1517842.9, dated Apr. 8, 2016, 8 pages.
Search Report in counterpart European Application No. 15182675.7, dated Dec. 4, 2015, 10 pages.
Wikipedia, "3D projection" Downloaded on Nov. 25, 2015 from www.wikipedia.com, 4 pages.
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.
European Extended Search Report in Related EP Application No. 16172995.9, dated Aug. 22, 2016, 11 pages.
European Extended search report in related EP Application No. 15190306.9, dated Sep. 9, 2016, 15 pages.
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_E1 -Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
H. Sprague Ackley, "Automatic Mode Switching in a Volume Dimensioner", U.S. Appl. No. 15/182,636, filed Jun. 15, 2016, 53 pages, Not yet published.
Bosch Tool Corporation, "Operating/Safety Instruction for DLR 130", Dated Feb. 2, 2009, 36 pages.
European Search Report for related EP Application No. 16152477.2, dated May 24, 2016, 8 pages.
Mike Stensvold, "Get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].
Houle et al., "Vehical Positioning and Object Avoidance", U.S. Appl. No. 15/007,522 [not yet published], filed Jan. 27, 2016, 59 pages.
United Kingdom combined Search and Examination Report in related GB Application No. 1607394.2, dated Oct. 19, 2016, 7 pages.
European Search Report from related EP Application No. 16168216.6, dated Oct. 20, 2016, 8 pages.
Peter Clarke, Actuator Developer Claims Anti-Shake Breakthrough for Smartphone Cams, Electronic Engineering Times, p. 24, May 16, 2011.
Spiller, Jonathan; Object Localization Using Deformable Templates, Master's Dissertation, University of the Witwatersrand, Johannesburg, South Africa, 2007; 74 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
European Search Report for application No. EP13186043 dated Feb. 26, 2014 (now EP2722656 (Apr. 23, 2014)): Total pages 7.
International Search Report for PCT/US2013/039438 (WO2013166368), dated Oct. 1, 2013, 7 pages.
Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant.

(56) References Cited

OTHER PUBLICATIONS

European Office Action for application EP 13186043, dated Jun. 12, 2014(now EP2722656 (Apr. 23, 2014)), Total of 6 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
U.S. Appl. No. 14/801,023, Tyler Doomenbal et al., filed Jul. 16, 2015, not published yet, Adjusting Dimensioning Results Using Augmented Reality, 39 pages.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912; filed Feb. 4, 2009 (now expired), 56 pages.
Dimensional Weight—Wikipedia, the Free Encyclopedia, URL= http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
European Patent Office Action for Application No. 14157971.4-1906, dated Jul. 16, 2014, 5 pages.
European Patent Search Report for Application No. 14157971.4-1906, dated Jun. 30, 2014, 6 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008), 6 pages.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
Proesmans, Marc et al. "Active Acquisition of 3D Shape for Moving Objects" 0-7803-3258-X/96 1996 IEEE; 4 pages.
Salvi, Joaquim et al. "Pattern Codification Strategies in Structured Light Systems" published in Pattern Recognition; The Journal of the Pattern Recognition Society, Accepted Oct. 2, 2003, 23 pages.
EP Search and Written Opinion Report in related matter EP Application No. 14181437.6, dated Mar. 26, 2015, 7 pages.
Hetzel, Gunter et al.; "3D Object Recognition from Range Images using Local Feature Histograms,", Proceedings 2OO1 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Second Chinese Office Action in related CN Application No. 201520810685.6, dated Mar. 22, 2016, 5 pages, no references.
European Search Report in related EP Application No. 15190315.0, dated Apr. 1, 2016, 7 pages.
Second Chinese Office Action in related CN Application No. 2015220810562.2, dated Mar. 22, 2016, 5 pages. English Translation provided [No references].
European Search Report for related Application EP 15190249.1, dated Mar. 22, 2016, 7 pages.
Second Chinese Office Action in related CN Application No. 201520810313.3, dated Mar. 22, 2016, 5 pages. English Translation provided [No references].
U.S. Appl. No. 14/800,757, Eric Todeschini, filed Jul. 16, 2015, not published yet, Dimensioning and Imaging Items, 80 pages.
U.S. Appl. No. 14/747,197, Serge Thuries et al., filed Jun. 23, 2015, not published yet, Optical Pattern Projector; 33 pages.

U.S. Appl. No. 14/747,490, Brian L. Jovanovski et al., filed Jun. 23, 2015, not published yet, Dual-Projector Three-Dimensional Scanner; 40 pages.
Search Report and Opinion in related GB Application No. 1517112.7, dated Feb. 19, 2016, 6 Pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating a Volume Dimensioner; 63 pages.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG 10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
European Search Report for Related EP Application No. 15189214.8, dated Mar. 3, 2016, 9 pages.
Santolaria et al. "A one-step intrinsic and extrinsic calibration method for laster line scanner operation in coordinate measuring machines", dated Apr. 1, 2009, Measurement Science and Technology, IOP, Bristol, GB, vol. 20, No. 4; 12 pages.
Search Report and Opinion in Related EP Application 15176943.7, dated Jan. 8, 2016, 8 pages.
European Search Report for related EP Application No. 15188440.0, dated Mar. 8, 2016, 8 pages.
United Kingdom Search Report in related application GB1517842.9, dated Apr. 8, 2016, 8 pages.
Great Britain Search Report for related Application On. GB1517843.7, dated Feb. 23, 2016; 8 pages.
Padzensky, Ron; "Augmera; Gesture Control", Dated Apr. 18, 2015, 15 pages [Art in Office Action dated Jan. 20, 2017 in related Application.].
Grabowski, Ralph; "New Commands in AutoCADS 2010: Part 11 Smoothing 3D Mesh Objects" Dated 2011, 6 pages, [Art in Office Action dated Jan. 20, 2017 in related Application.].
Theodoropoulos, Gabriel; "Using Gesture Recognizers to Handle Pinch, Rotate, Pan, Swipe, and Tap Gestures" dated Aug. 25, 2014, 34 pages, [Art in Office Action dated Jan. 20, 2017 in related Application.].
European Extended Search Report in related EP Application No. 16190017.0, dated Jan. 4, 2017, 6 pages.
European Extended Search Report in related EP Application No. 16173429.8, dated Dec. 1, 2016, 8 pages [Only new references cited: US 2013/0038881 was previously cited].
Extended European Search Report in related EP Application No. 16175410.0, dated Dec. 13, 2016, 5 pages.
Wikipedia, "Microlens", Downloaded from https://en.wikipedia.org/wiki/Microlens, pp. 3. {in Feb. 9, 2017 Final Office Action in related matter}.

(56) References Cited

OTHER PUBLICATIONS

Fukaya et al., "Characteristics of Speckle Random Pattern and Its Applications", pp. 317-327, Nouv. Rev. Optique, t.6, n.6. (1975) {in Feb. 9, 2017 Final Office Action in related matter: downloaded Mar. 2, 2017 from http://iopscience.iop.org}.
European Examination report in related EP Application No. 14181437.6, dated Feb. 8, 2017, 5 pages.
European extended search report in related EP Application 16190833.0, dated Mar. 9, 2017, 8 pages [only new art has been cited; US Publication 2014/0034731 was previously cited].
United Kingdom Combined Search and Examination Report in related Application No. GB1620676.5, dated Mar. 8, 2017, 6 pages [References have been previously cited; WO2014/151746, WO2012/175731, US 2014/0313527, GB2503978].
European Exam Report in related , EP Application No. 16168216.6, dated Feb. 27, 2017, 5 pages, [References have been previously cited; WO2011/017241 and US 2014/0104413].
Thorlabs, Examiner Cited NPL in Advisory Action dated Apr. 12, 2017 in related commonly owned application, downloaded from https://www.thorlabs.com/newgrouppage9.cfm?objectgroup_id=6430, 4 pages.
Eksma Optics, Examiner Cited NPL in Advisory Action dated Apr. 12, 2017 in related commonly owned application, downloaded from http://eksmaoptics.com/optical-systems/f-theta-lenses/f-theta-lens-for-1064-nm/, 2 pages.
Sill Optics, Examiner Cited NPL in Advisor Action dated Apr. 12, 2017 in related commonly owned application, http://www.silloptics.de/1/products/sill-encyclopedia/laser-optics/f-theta-lenses/, 4 pages.
Chinese Notice of Reexamination in related Chinese Application 201520810313.3, dated Mar. 14, 2017, English computer Translation provided, 7 pages [No new art cited].
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017].
Ralph Grabowski, "Smothing 3D Mesh Objects," New Commands in AutoCAD 2010: Part 11, art in related matter Non Final Office Action dated May 19, 2017; 6 pages.
European Exam Report in related EP Application No. 15176943.7 dated Apr. 12, 2017, 6 pages [Art previously cited in this matter].
European Exam Report in related EP Application No. 15188440.0, dated Apr. 21, 2017, 4 pages [No new art to cite].
European Exam Report in related EP Application No. 16152477.2, dated Jun. 20, 2017, 4 pages [No art to be cited].
European Exam Report in related EP Applciation 16172995.9, dated Jul. 6, 2017, 9 pages [No new art to be cited].
United Kingdom Search Report in related Application No. GB1700338.5, dated Jun. 30, 2017, 5 pages.
European Search Report in related EP Application No. 17175357.7, dated Aug. 17, 2017, pp. 1-7 [No new art to be cited].
Boavida et al., "Dam monitoring using combined terrestrial imaging systems", 2009 Civil Engineering Survey De/Jan. 2009, pp. 33-38 {Cited in Notice of Allowance dated Sep. 15, 2017 in related matter}.
Ulusoy, Ali Osman et al.; "One-Shot Scanning using De Bruijn Spaced Grids", Brown University; 2009 IEEE 12th International Conference on Computer Vision Workshops, ICCV Workshops, pp. 1786-1792 [Cited in EPO Search Report dated Dec. 5, 2017}.
Extended European Search report in related EP Application No. 17189496.7 dated Dec. 5, 2017; 9 pages.
Extended European Search report in related EP Application No. 17190323.0 dated Jan. 19, 2018; 6 pages [Only new art cited herein].
Examination Report in related GB Application No. GB1517843.7, dated Jan. 19, 2018, 4 pages [Only new art cited herein].
Examination Report in related EP Application No. 15190315, dated Jan. 26, 2018, 6 pages [Only new art cited herein].
EP Search Report in related EP Application No. 17171844 dated Sep. 18, 2017. 4 pages [Only new art cited herein}.
EP Extended Search Report in related EP Applicaton No. 17174843.7 dated Oct. 17, 2017, 5 pages {Only new art cited herein}.
UK Further Exam Report in related UK Application No. GB1517842.9, dated Sep. 1, 2017, 5 pages (only new art cited herein).
European Extended Search Report in related EP Application No. 17201794.9, dated Mar. 16, 2018, 10 pages.
European Extended Search Report in related EP Application 17205030.4, dated Mar. 22, 2018, 8 pages.
European Exam Report in related EP Application 16172995.9, dated Mar. 15, 2018, 7 pages.
United Kingdom Combined Search and Examination Report dated Mar. 21, 2018, 5 pages.
European extended Search Report in related Application No. 17207882.6 dated Apr. 26, 2018, 10 pages.

\* cited by examiner

DIMENSIONING AND IMAGING ITEMS

TECHNOLOGY FIELD

The present invention relates generally to dimensioning. More particularly, example embodiments of the present invention relate to dimensioning and imaging items.

BACKGROUND

Generally speaking, logistical processes increase efficiency and reduce cost of commerce in relation to storing inventory and transporting cargo. For example, storage space is finite and transport media, such as trailers, have specified capacities. Logistic processing apportions cargoes and inventories efficiently over the available spaces, which can facilitate storage and expedite transport.

To apportion a cargo or inventory, dimensions of each of the constituent packages, boxes, crates and other items ("items") are measured. The measured dimensions are processed in relation to the available storage or transport space. Based on the processing, a position within the storage/transport space is computed that optimizes placement of each inventory/cargo item relative to each of the other items.

Real costs and expenses are associated with storing inventory items and shipping cargo items. The apportionment of the inventory and cargo is thus significant for economizing on the storage and shipping costs and expenses. Moreover, the measurement of the dimensions ("dimensioning") of inventory/cargo items is significant in recovering the costs and expenses associated with the storage/shipping thereof.

In addition to weight and some other factors for example, fees charged, and expenditures paid, in association with storing inventory items (e.g., rent), and with transporting cargo items (e.g., shipping fares) may be based on the measurements of the dimensions of the inventory/cargo items. Typically, the costs associated with the storage/shipping of the inventory/cargo items have a direct, positive correlation with their size.

The measuring of the dimensions of the cargo/inventory items may be automated by a dimensioning apparatus ("dimensioner"), which may be operable optically. Optically based dimensioners are typically operable for capturing image data using photographic and/or videographic techniques. Image data captured in relation to surfaces of the cargo/inventory items are used for computing the measurements.

Dimensioners capture the image data over two or more measurably sufficient surfaces of the cargo/inventory items to produce measurements with levels of accuracy sufficient for commercial application. Use of three good surfaces may improve measurement accuracy. Some dimensioners comprise depth-sensing cameras for sensing the dimension measurements. Some of the cameras may have viewfinder components.

Some of the dimensioners may also use software to superimpose the measurements of the dimensions of the inventory/storage items, in near real-time, onto a view of the items rendered in the camera viewfinder. However, superimposing the dimension measurements onto the viewfinder draws the operator's attention away from the real item to the dimensioner screen and fails to provide useful indication to fee payers.

Therefore, a need exists for measuring dimensions of ("dimensioning") inventory/cargo items. A need also exists for rendering the measured dimensions onto the surfaces of the items in real time or near real time with respect to the measurement of the dimensions thereof the dimensioned items, which obviates an observation of a display screen that distracts attention of operators, customers and other users from the items, themselves. Further, a need exists for rendering the measured dimensions with maximum readability and/or minimal visual distortion, which allows capturing images of the dimensioned inventory/cargo items, in which the measured dimensions of the dimensioned items are represented, in real-time, with a rendering of the captured images of the items.

SUMMARY

Accordingly, in one aspect, embodiments of the present invention embrace measuring dimensions ("dimensioning") of three dimensional (3D) inventory/cargo items. Example embodiments obviate observation of display screens, which could distract attention of operators, customers and other users from the 3D items, themselves. Further, example embodiments of the present invention are operable for rendering the measured dimensions with maximum readability and minimal visual distortion.

An example embodiment allows images of the dimensioned inventory/cargo items to be captured, in which the measured dimensions of the dimensioned items are represented, in real-time, with a rendering of the captured images of the items. The captured images of the dimensioned inventory/cargo items comprise representations of the measured dimensions ("dimensional representations") of the dimensioned items rendered, in real-time and with correct perspective, onto two dimensional (2D) surfaces of the 3D items.

Example embodiments of the present invention relate to dimensioning 3D inventory/cargo items. A field of view (FOV) is mapped over three spatial dimensions, each of the three spatial dimensions oriented orthogonally in relation to each of the other spatial dimensions and graduated according to a linear scale. The 3D item is scanned relative to the mapped FOV. Each of the two dimensional (2D) surfaces of the scanned 3D item are identified. A dimension is measured for each of the identified 2D surfaces of the scanned 3D item. A perspective-corrected representation of the measured dimension is rendered, in real time or near real time, with respect to the measuring the dimension step, onto each of the identified 2D surfaces of the scanned 3D item.

The 3D item may comprise a package, box, crate, container, envelope, or another article related to a storage, transport (e.g., shipping), or other logistic or commercial operation or activity.

A 2D surface of the scanned 3D item is identified. A dimension of the identified 2D surface of the scanned 3D item is measured. A representation of the measured dimension is rendered, e.g., with perspective based 3D projection, onto the identified 2D surface of the scanned 3D item. An image of the scanned 3D item may be captured in real time with respect to the 3D projection of the dimensional representation onto its 2D surfaces. The captured image thus comprises the representation of the measured dimension, rendered with undistorted projection onto the identified 2D surface of the scanned 3D item.

An example embodiment of the present invention relates to a method for dimensioning 3D inventory/cargo items. A FOV is mapped over three spatial dimensions, each of the three spatial dimensions oriented orthogonally in relation to each of the other spatial dimensions and graduated according to a linear scale. The 3D item is scanned relative to the mapped FOV. Each of the 2D surfaces of the scanned 3D item is identified. A dimension is measured for each of the identified 2D surfaces of the scanned 3D item. A perspective-corrected representation of the measured dimension is rendered, in real time or near real time, with respect to the measuring the dimension step, onto each of the identified 2D surfaces of the scanned 3D item.

The identification of each of the 2D surfaces of the scanned 3D item may comprise detecting each of the 2D surfaces of the scanned 3D item, and orienting each of the detected 2D surface of the scanned 3D item in relation to the three spatial dimensions of the mapped FOV. The rendering of the perspective corrected representation of the measured dimension may comprise computing an incident angle and a normal angle, based on the orienting the detected 2D surface of the scanned 3D item in relation to the at least two spatial dimensions of the mapped FOV, for a projection of the rendering of the measured dimension onto the identified 2D surface of the scanned 3D item.

A translation matrix is computed, which is operable for translating the projection of the rendering in an alignment with the computed normal angle. A model of the scanned 3D item is texture mapped. The texture mapped model is disposed within a virtual 3D space corresponding, and scaled in relation, to the mapped FOV. The detected 2D surface of the scanned item is modeled within the 3D space based on the orienting step. The rendered representation of the measured dimension is projected onto the identified 2D surface of the scanned 3D item based on the texture mapped model.

The projection of the rendered measured dimension onto the identified 2D surface of the scanned 3D item based on the texture mapped model may comprise computing a projection of the texture mapped model from a perspective corresponding to the scanning and the rendering. The projecting of the rendered representation is performed based on the computed projection. In an example embodiment, an illusion is created of multiple individual projections, each of which is rendered onto a corresponding 2D surface of the 3D item with a perspective that appears projected in alignment with the normal angle computed in relation thereto.

A location may be delineated for a positioning of the 3D item. The scanning of the 3D item may be initiated upon the positioning of the 3D item in the delineated position. The initiation of the scanning may be performed automatically upon a detection of the positioning the 3D item in the delineated position.

The delineated position may correspond with the location of a scale, which is operable for detecting a weight of the 3D item. The method may further comprise detecting the weight of the 3D item, in which the rendering of the perspective corrected representation comprises rendering the detected weight, in real time or near real time with respect to the rendering of the measured dimension, onto at least one of the identified 2D surfaces of the 3D item.

A volume of the 3D object may be computed based on the measured dimension of each of the identified 2D surfaces thereof. The rendering of the perspective corrected representation may thus also comprise rendering the computed volume, in real time or near real time with respect to the rendering of the measured dimension, onto at least one of the identified 2D surfaces of the 3D item.

A fee, such as a charge relating to shipping the 3D item or a rent relating to storing the 3D item, may be computed based on the measured dimensions of the 2D surfaces, the computed volume, or the detected weight of the 3D item.

An image of the scanned 3D item in may be real time with respect to the rendering the representation step. The captured image may thus comprise the representation of the measured dimension rendered with the corrected perspective on each of the identified 2D surfaces of the scanned 3D item.

Example embodiments may thus obviate operator distractions related to focusing attention at a display screen of the dimensioner/imager. At the same time, example embodiments may provide visual information useful to customers, in relation to fees and other shipping/storage charges.

In another aspect, an embodiment of the present invention embraces a non-transitory computer readable storage medium comprising instructions. In an example embodiment, the instructions are operable when executing on a computer processor for causing and/or controlling a process for dimensioning and imaging a 3D item (e.g., as summarized above).

In yet another aspect, an embodiment of the present invention embraces a system operable for dimensioning a 3D item and rendering a representation of the dimensions on a surface of the item visibly and without perspective related legibility distortions.

In an example embodiment, the system comprises a dimensioner component (dimensioner) operable for dimensioning 3D inventory/cargo items (e.g., in relation to the example method summarized above). The system also comprises a projector component (projector) communicatively coupled to the dimensioner. The projector is operable with the dimensioner for rendering a perspective corrected representation of the measured dimension (perspective based dimensional representation). The perspective based dimensional representation is rendered, in real time or near real time with respect to the measurement of the dimension, onto each of the identified 2D surfaces of the scanned 3D item.

In an example embodiment, the dimensioner and the projector each comprise at least one computer processor and non-transitory computer readable storage medium. The non-transitory computer readable storage media comprise instructions operable for configuring and/or programming ("configuring/programming") the dimensioner and projector. For example, the instructions are operable for controlling the processors of the dimensioner and the projector in relation to the dimensioning of the 3D inventory/cargo items (e.g., in relation to the example method summarized above).

The projector and the camera of the dimensioning/imaging system may be packaged together into a single apparatus housing, which is disposed or deployed in a fixed or stationary position. The dimensioning/imaging system may be disposed, deployed, or moved into a position that is located other than, e.g., directly above the package or other item. Embodiments of the present invention are operable for preventing the representation, or other graphics, projected onto the surface of the physical 3D item at angles that may result in a skewed appearance thereof, or otherwise other than optimally readable, viewable, etc.

For example, the system computes incident and normal angles for the projection of the dimensional representation at each surface. The incident and normal angles may be computed in relation to an examination of a depth map produced by components of the camera, which are operable together for sensing depth of its FOV.

The camera components exchange data signals, which comprise information, with which embodiments prevent the dimensional representation from being projected onto the surface of the item at angles that may skew the appearance thereof, or otherwise render the representation as other than optimally readable or viewable.

For example, the system computes incident and normal angles for the projection of the dimensional representation at each surface. The incident and normal angles may be computed in relation to an examination of a depth map produced by camera components, which operate together for mapping the camera's FOV in the three dimensions, including a depth related dimension.

The projection angle information exchanged between the components of the camera creates translation matrices, which are applied in relation to the dimensional representation, for rendering on respective corresponding surfaces of the physical 3D item.

Using the translation matrices, the dimensional representation is rendered with an appearance as if it would appear if projected directly above each respective corresponding surface (along the normal line) of the item. This enhances readability and diminishes any visual distortions, which could otherwise arise (e.g., with orthographic projection strictures).

In example embodiment of the present invention, texture mapping is used for mapping 2D image data comprising alphanumeric, ideographic, and/or pictographic text and graphics of the dimension measurement representation onto each of the respective corresponding surfaces of the physical 3D item.

An example embodiment is implemented in which the projector and the camera are incorporated into a unitary dimensioning/imaging system package. A processor (e.g., DLP) component of the projector is communicatively coupled to package dimensioning software, stored in a non-transitory computer readable storage medium of the camera and operable with components thereof. The system is thus operable for rendering the dimensional representation onto corresponding spatially respective surfaces of the physical 3D item with correct perspective. The correct spatial perspective maximizes legibility of the dimensional representation, which could otherwise be distorted by orthographic projection strictures.

For example, an embodiment is implemented in which depth sensors of the camera produce depth maps of its FOV. Components of the camera are operable for processing the depth maps and thus, for detecting edges and surfaces from image data captured in relation to the physical 3D item. Information relating to the detected edges and surfaces is communicated to a projection software routine running on the projector.

The 2D surface and edge related information is used by the camera to model the physical 3D item computationally. The model of the item reconstructs the item in a 3D space, which corresponds and scales computationally to the FOV. In an example embodiment, dimensional graphics for each surface are computed and mapped to their respective surfaces on the reconstructed 3D model based on texture mapping.

All of the surfaces of the physical 3D item may be mapped onto the 3D model thereof. A perspective based projection of the model, with the dimensional graphics mapped thereon, from a perspective based "point of view" of the system, is rendered and projected onto the physical 3D item. An example embodiment is implemented in which an illusion of multiple projection sources on the physical 3D item is presented, which optimizes clarity of perspective and readability, legibility and/or aesthetic quality of the dimensional representation on each respectively corresponding surface of the item.

In an example embodiment, operator assisted and/or automated positioning of the item within the system FOV is effectuated by a projection of graphical positioning guides onto the package and a corresponding ground plane of the deck.

An example embodiment may be implemented in which the positioning guides are projected in relation to a scale or other weight detection apparatus within the ground plane of the FOV. Upon measuring a weight of the item, information related thereto (e.g., weight, mass, associated shipping/transport fees, etc.) may also be rendered onto a surface of the item. An image captured of the item may also thus comprise the weight related data.

An example embodiment may be implemented in which the rendering of the representation of the measured dimension, onto the identified surface of the scanned item, comprises rendering a representation of the measurement computed for each of the first detected surface, the second detected surface, and the third detected surface onto each corresponding surface of the scanned item.

The captured image of the scanned item, comprising the representation of the dimension measurement computed for the surfaces, may then be processed further and/or used in other processing operations. For example, an example embodiment may be implemented in which the captured image of the scanned item, comprising the representation of the dimension measurement computed for the surfaces, is used in an application relating to logistics and/or commerce.

An example embodiment may be implemented in which the captured image, with the dimension related representation, may be sent by a dimensioner over a data network to another computer. The dimensioner or the other computer may perform an action based on the representation of the measured dimension rendered on the identified surface of the scanned item.

The captured image, with the dimension related representation, may thus be used to compute or verify charges (such as rent and/or shipping fees) to be charged or resolved in relation to storing an inventory item or transport of a cargo item. The rent or fees may correspond to a size, area or volume associated with the dimension and its rendered representation.

In an example embodiment, the imaging system may further comprise at least one processor component operable for processing the captured image of the scanned item, the captured image comprising the rendered dimension of the item. The at least one processor further comprise one or more processor components, each operable for performing at least one of a plurality of ("multiple") actions based on the representation of the measured dimension rendered on the identified surface of the scanned item based on the processing of the captured image.

The foregoing illustrative summary, as well as other example features, functions and/or aspects of embodiments of the invention, and the manner in which the same are accomplished, are further explained within the following detailed description of example embodiments and each figure (FIG.) of the accompanying drawings.

DETAILED DESCRIPTION OF EXAMPLE EMBODIMENTS

Figure 1:
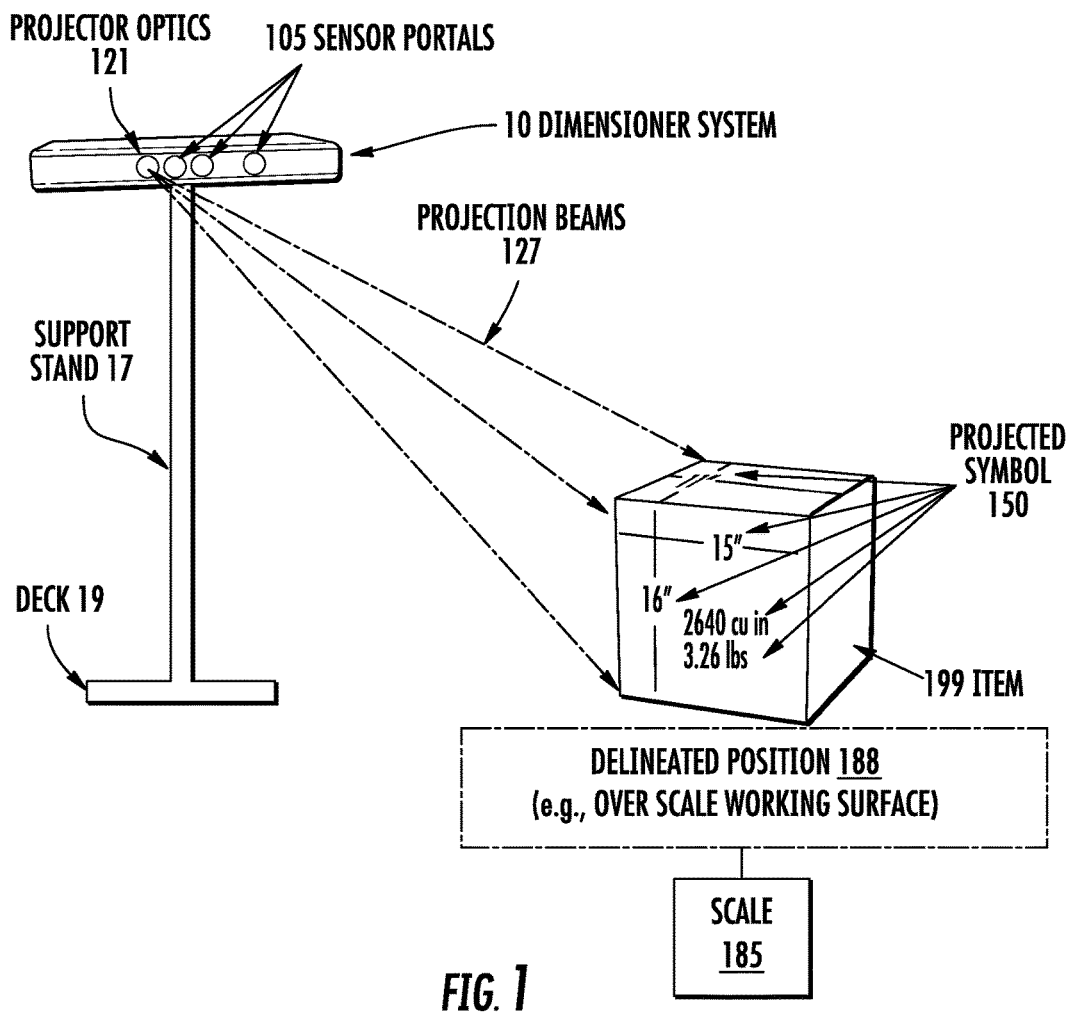
FIG. 1 depicts an example dimensioner system, showing an example use setting thereof, according to an embodiment of the present invention.

Example embodiments of the present invention are described in relation to dimensioning 3D inventory/cargo items. A FOV is mapped over three spatial dimensions, each of the three spatial dimensions oriented orthogonally in relation to each of the other spatial dimensions and graduated according to a linear scale. The 3D item is scanned relative to the mapped FOV. Each of the 2D surfaces of the scanned 3D item is identified. A dimension is measured for each of the identified 2D surfaces of the scanned 3D item. A perspective-corrected representation of the measured dimension is rendered, in real time or near real time, with respect to the measuring the dimension step, onto each of the identified 2D surfaces of the scanned 3D item.

Overview.

An example embodiment of the present invention relates to a method for dimensioning 3D inventory/cargo items. A FOV is mapped over three spatial dimensions, each of the three spatial dimensions oriented orthogonally in relation to each of the other spatial dimensions and graduated according to a linear scale. The 3D item is scanned relative to the mapped FOV. Each of the 2D surfaces of the scanned 3D item is identified. A dimension is measured for each of the identified 2D surfaces of the scanned 3D item. A perspective-corrected representation of the measured dimension is rendered, in real time or near real time, with respect to the measuring the dimension step, onto each of the identified 2D surfaces of the scanned 3D item.

The identification of each of the 2D surfaces of the scanned 3D item may comprise detecting each of the 2D surfaces of the scanned 3D item, and orienting each of the detected 2D surface of the scanned 3D item in relation to the three spatial dimensions of the mapped FOV. The rendering of the perspective corrected representation of the measured dimension may comprise computing an incident angle and a normal angle, based on the orienting the detected 2D surface of the scanned 3D item in relation to the at least two spatial dimensions of the mapped FOV, for a projection of the rendering of the measured dimension onto the identified 2D surface of the scanned 3D item.

A translation matrix is computed, which is operable for translating the projection of the rendering in an alignment with the computed normal angle. A model of the scanned 3D item is texture mapped. The texture mapped model is disposed within a virtual 3D space corresponding, and scaled in relation to, the mapped FOV. The detected 2D surface of the scanned item is modeled within the 3D space based on the orienting step. The rendered representation of the measured dimension is projected onto the identified 2D surface of the scanned 3D item based on the texture mapped model.

The projection of the rendered measured dimension onto the identified 2D surface of the scanned 3D item based on the texture mapped model may comprise computing a projection of the texture mapped model from a perspective corresponding to the scanning and the rendering. The projecting of the rendered representation is performed based on the computed projection. In an example embodiment, an illusion is created of multiple individual projections, each of which is rendered onto a corresponding 2D surface of the 3D item with a perspective that appears projected in alignment with the normal angle computed in relation thereto.

Example System for Dimensioning and Imaging an Item

FIG. 1 depicts an example dimensioning and imaging (dimensioning/imaging) system 10, showing an example use setting thereof according to an embodiment of the present invention. The dimensioning/imaging system (dimensioner/imager) 10 is operable for computing measurements of the surfaces of a 3D item 199 in relation to two or more (e.g., three) spatial dimensions. The 3D item 199 may comprise a box, crate, envelope, or other package associated with an inventory to be stored and/or a cargo to be shipped, moved, or transported.

Figure 2:
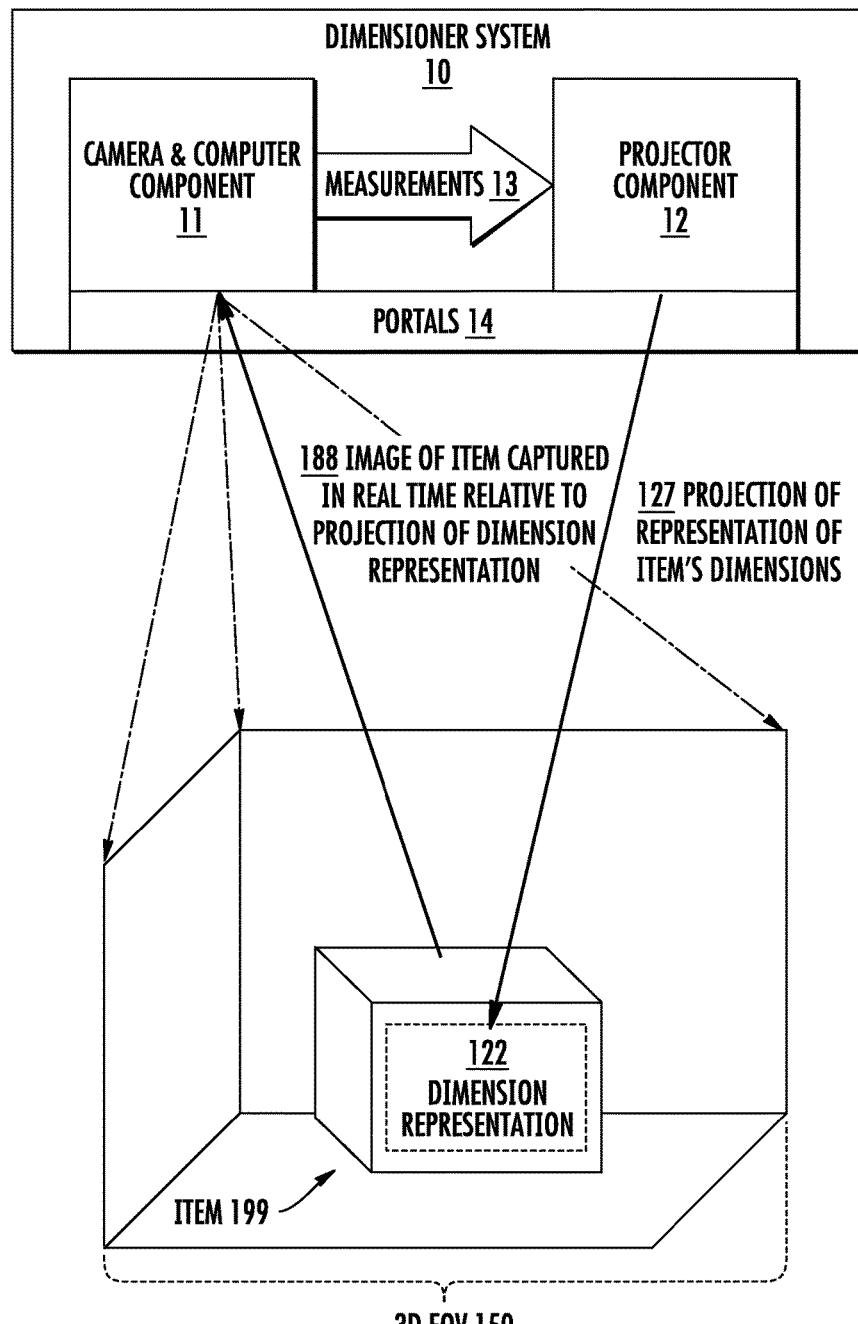
FIG. 2 depicts an the dimensioner system schematically, according to an example embodiment of the present invention.

The dimensioner 10 comprises a depth sensing camera (e.g., camera 11; FIG. 2, 3), which is operable for imaging a 3D scene within a mapped FOV. The system 10 may be mounted on a support 17, which may be disposed at a fixed (or at least stationary) location on a deck or other work surface ("deck") 19. The depth sensor camera may also be embedded, deployed, or disposed within a hand held computer device, such as a 3D camera, tablet computer, portable data terminal (PDT), smartphone, or portable/personal digital assistant (PDA).

In either the fixed/stationary or hand-held/portable implementations, the depth sensing camera of the system 10 is operable for detecting the dimensions of 3D objects, including the item 199, which are placed into the FOV 150. The camera 11 is also operable for capturing an image of the detected item 199. In an example embodiment, the captured image comprises a representation of the detected dimensions (e.g., representation 122; FIG. 2, 3) rendered without perspective related distortion by 3D projection onto the respectively corresponding 2D surfaces of the 3D item 199.

A location 188 may be delineated for a positioning of the 3D item. The scanning of the 3D item may be initiated upon the positioning of the 3D item in the delineated position 188. The initiation of the scanning may be performed automatically upon a detection of the positioning the 3D item in the delineated position 188.

The delineated position 188 may correspond with the location of a scale or working surface thereof ("scale") 185, which is operable for detecting a weight of the 3D item 199. The method may further comprise detecting the weight of the 3D item 199, in which the rendering of the perspective corrected representation 122 comprises rendering the detected weight, in real time or near real time with respect to the rendering of the measured dimension, onto at least one of the identified 2D surfaces of the 3D item 199.

A volume of the 3D item 199 may be computed based on the measured dimension of each of the identified 2D surfaces thereof. The rendering of the perspective corrected representation 122 may thus also comprise rendering the computed volume, in real time or near real time with respect to the rendering of the measured dimension, onto at least one of the identified 2D surfaces of the 3D item 199.

A fee, such as a charge relating to shipping the 3D item 199 or a rent relating to a storing of the item, may be computed based on the measured dimensions of the 2D surfaces, the computed volume, or the detected weight thereof.

An image of the scanned 3D item 199 in may be real time with respect to the rendering the representation step. The captured image may thus comprise the representation 122 of the measured dimension rendered with the corrected perspective on each of the identified 2D surfaces of the scanned 3D item. Example embodiments may thus obviate operator distractions related to focusing attention at a display screen of the dimensioner/imager. At the same time, example embodiments may provide visual information useful to customers, in relation to fees and other shipping/storage charges.

The system 100 is operable for processing depth maps of the FOV 150, produced by the depth sensing camera 11, to identify 2D surfaces and edges of the 3D item 199 and to compute the dimensions of each of the detected surfaces. Using the detected surfaces, 2D image processing (e.g., texture mapping) may be performed. A volume of the 3D item 199 may also be computed based on the dimensions measured for each of its 2D surfaces.

Texture mapping 2D image processing may be performed on the depth maps to model the 3D item 199 in a virtual 3D space, which may be used for computing perspective-based projections of the dimensional representation 122 for rendering onto the 2D surfaces in real time or near real time relative to the measurement of the dimensions. The projector component 12 is operable for rendering perspective based 3D projections of the dimensional representations 122 directly onto respectively corresponding 2D surfaces of the 3D item 199.

In an example embodiment of the present invention, the 3D item 199 may be imaged. The image comprises real time dimensional representation of the computed measurements. The dimensional representation is rendered in real time with a perspective based 3D projection onto the respectively corresponding 2D surfaces of the 3D item 199. Example embodiments may thus obviate operator distractions related to focusing attention at a display screen of the dimensioner/imager, while at the same time providing visual information useful to customers. The useful information may relate to shipping fees, rents and other transport/storage charges.

FIG. 2 depicts the dimensioning and imaging system 10 schematically, according to an example embodiment of the present invention. The dimensioning and imaging system 100 comprises a depth sensing camera component ("camera") 11 and a projector component ("projector") 12. The camera 11 is operable for measuring the dimension of the item 199 and providing a corresponding set of dimension measurements 13 to the projector 12. The projector 12 is operable for rendering a perspective based 3D projection of a symbol or other representation 122 of the dimension of the 3D item 199 on a 2D surface thereof. The perspective based 3D projection may be transmitted with a projection beam 127 through the portals 14.

As used herein, the term "perspective based 3D projection," in relation to the dimensional representations 122, refers to projecting the dimensional representations 122 onto each respective, corresponding 2D surface of the 3D item 199, as though being projected at a normal angle thereto and thus, with maximum legibility. Computations relating to the projection of the representation 122, with correct perspective and maximum legibility, onto each of the 2D surfaces of the 3D item 199 may be performed within the camera 11 and communicated to the projector 12, within the projector 12, or split between them. For example, a portion of these computations may be performed in each of the camera 11 and the projector 12 and communicated from one to the other.

The camera 11 is also operable for capturing an image 188 of the item 199, through the portals 14. The captured image comprises the perspective based 3D projection of the dimensional representations 122 rendered on the respectively corresponding 2D surfaces thereof.

Figure 3:
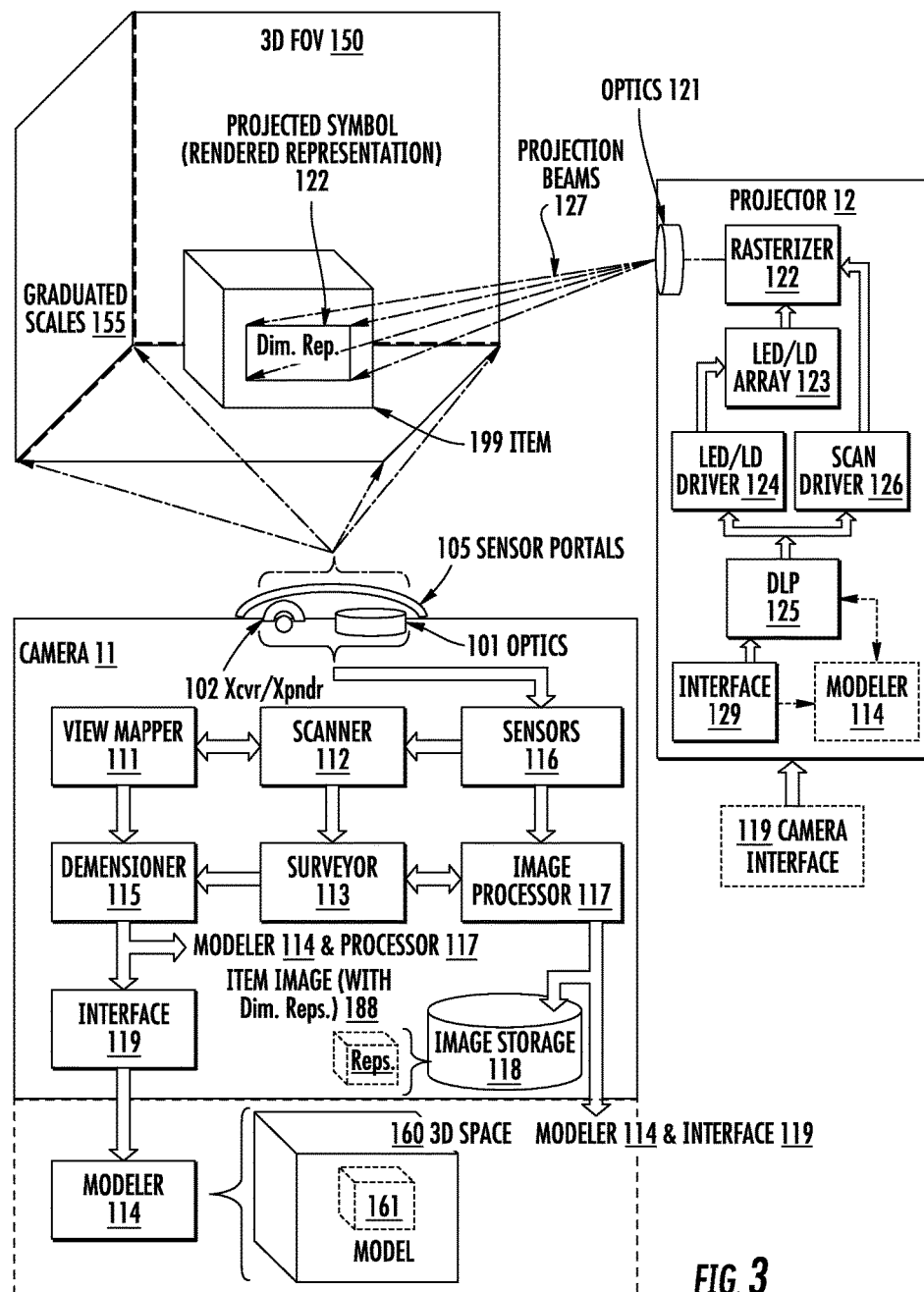
FIG. 3 depicts the dimensioner system, showing an example data flow therein according to an embodiment of the present invention.

The portals 14 may comprise sensor portals (e.g., portal 105; FIG. 3), as well at least one portal operable for allowing emission of the projection beams 127 from the projector 12. The portals 14 may be transparent to the passage of broad band visible (e.g., white) light and electromagnetic waves of and other (e.g., microwave) frequencies, and may also allow passage of ultrasonic vibrations.

The projector 12 may be disposed, deployed, or moved into a position that is located other than, e.g., directly above the package or other item 199. However, embodiments of the present invention are operable for preventing the representation 122, or other graphics, projected onto the surface of the item 199 at angles that may result in a skewed appearance thereof, or otherwise other than optimally readable, viewable, etc.

For example, the system 10 is operable for computing incident and normal angles for the projection of the representation 122 at each surface. The incident and normal angles may be computed in relation to an examination of a depth map produced by components of the camera 11, which operate together for sensing depth of the FOV 150 thereof.

An example embodiment is implemented in which the projector 12 is incorporated, along with the camera 11, into a single or unitary housing of the dimensioning/imaging system 10. A component (e.g., DLP 125; FIG. 3) of the projector 12 is communicatively coupled to package dimensioning software, stored in a non-transitory computer readable storage medium thereof, or stored in the camera 11 and operable with components thereof.

The system 10 is thus operable for rendering the representation 122 onto corresponding spatially respective surfaces of the item 199 with correct perspective. The correct spatial perspective maximizes legibility of the representation 122, which could otherwise be distorted by orthographic strictures. The projector 12 and the camera 11 may also be disposed or deployed in separate locations, for which the components may exchange compensating signals.

As the 3D item 199 is scanned, depth sensors of the camera 11 generate depth maps of the 3D item 199 within the camera FOV 150. Components of the camera 11 process the generated depth maps of the item, and are thus operable for detecting its 2D surfaces and edges, for measuring the dimensions thereof, and for generating representations 122 of the measured dimensions. The volume of the item 199 may be computed based on the measured dimensions.

Texture mapping techniques may be used to compute a 3D model of the item 199 in a virtual 3D space, in which the generated representations 122 are mapped to each corresponding respective 2D surface from a perspective aligned with a normal angle thereto. Information relating to the computed model is communicated to the projector 12. Based on the communicated information and perspective based 3D projection techniques, the projector 12 is operable for rendering the representations 122 onto each 2D surface of the 3D item 199 respectively corresponding thereto with minimal perspective related distortion.

The surface and edge related information is used by the camera 11 to texture map a model the 3D item 199. The model of the item reconstructs the item in a virtual 3D space, which corresponds, and scales, computationally to the FOV 150.

Upon texture mapping the surfaces of the 3D item 199 onto the model, a perspective based 3D projection of the model, with the dimensional graphics mapped thereto, from the perspective "point of view" of the camera 11 and the projector 12, is rendered and projected onto the physical 3D item 199. An example embodiment is implemented in which an illusion of multiple projection sources on the package is presented, which optimizes clarity of perspective and readability, legibility and/or aesthetic quality of the representation 122 on each respectively corresponding surface of the item 199.

In an example embodiment, operator assisted and/or automated positioning of the item 199 within the FOV 150 is effectuated by a projection of graphical positioning guides onto the package and/or a delineated position 188 on a working surface, such as a ground plane of the deck 19 (FIG. 1).

The delineated position may correspond to the location of the scale 185 or other weight detection apparatus. Upon measuring a weight of the item 199, information related thereto such as weight, mass, and associated shipping/transport fees may also be rendered onto a surface of the item 199. The computed volume of the item 199 may also be projected, along with the measured dimensions and the weight. An image captured of the item 199 may thus comprise data relating to the measured dimensions, the weight, and the volume of the item 199.

FIG. 3 depicts the dimensioning and imaging system, showing an example data flow therein according to an embodiment of the present invention. The camera 11 comprises one or more sensor components ("sensors") 116. The sensors 116 may be operable for sensing inputs transmitted through sensor portals 105. The sensor portals 105 may comprise optics 101. The optics 101 may comprise a window, lenses, and a light guide such as an optical fiber conduit, as well as filters, prisms, mirrors or the like. The optics 101 are operable for gathering light and providing (e.g., guiding, focusing, filtering, etc.) the gathered light as an optical input to the sensors 116.

The sensors 116 may comprise an array of photosensitive active optoelectronic devices (photosensors) operable for detecting an image in response to receiving the optical input from the optics 101. The photosensors may comprise a charge coupled device (CCD), complementary metal oxide semiconductor (CMOS), photodiode (PD), charge-injection device (CID), charge modulation device (CMD), P-channel or N-channel metal oxide semiconductor field effect transistor (MOSFET) device, or an array of the devices. The devices of the array may comprise a plurality ("two or more") of the CCD, CMOS, PD, CID, CMD, P-channel MOSFET (PMOS), or N-channel MOSFET (NMOS) devices.

The sensor portals 105 may also comprise a radar type transceiver ("Xcvr") and/or sonar type transponder ("Xpndr") 102. The radar transceiver 102 may be operable over a microwave or other radio frequency (RF) range of electromagnetic radiation. The sonar transponder 102 may be operable over an ultrasonic frequency range of vibrational waves.

The transceiver and/or transponder ("Xcvr/Xpndr") 102 is operable for transmitting microwave and/or ultrasonic signals to targets, such as the item 199, of the camera 11. The transceiver/transponder 102 is also operable for receiving reflection signals of the transmissions, reflected back from the targets. The reflection signals may be frequency shifted, phase shifted, and/or amplitude attenuated in relation to the transmitted signals.

The transceiver/transponder 102 provides input signals to the sensor 116 corresponding to the received reflection signals. Processing performed over the inputs from the transceiver/transponder 102 by one or more components of the sensors 116 provides a range finding capability to the camera 11 in relation to the target, which may be helpful in mapping the FOV 150, in which the item 199 and other targets may be disposed.

The projector 12 and the camera 11 each comprise a processor and a non-transitory computer readable storage medium. Each of the non-transitory computer readable storage media, of each of the projector 12 and the camera 11, comprise instructions operable for performing operational functions and features corresponding to each.

For example, the camera 11 may be configured/programmed according to its corresponding instruction instructions in relation to scanning the item, identifying the surface thereof, and measuring a dimension of the identified surface. In an example embodiment, the instructions of the camera 11 are operable for configuring/programming components of the camera as a computer system for operability as a scanner 112, a view mapper 111, a surveyor 113, a dimensioner 115, and a modeler 114.

Alternatively or additionally, an example embodiment may be implemented in which one or more of the scanner 112, view mapper 111, surveyor 113, dimensioner 115 and/or modeler 114 comprise, or are disposed in one or more microprocessors or other integrated circuit (IC) device components of the camera 11. The IC devices may comprise microcontrollers, programmable logic devices (PLDs) such as a field programmable gate array (FPGA), and/or an application specific IC (ASIC).

The modeler 114 may alternatively (or additionally, e.g., at least partially) be disposed in a component of the projector 12. For example, the DLP 125 (and/or another processor or other IC component) of the projector 12) may be operable for performing at least some of the computations of the modeler 114. Data relating to the dimensions of each of the 2D surfaces of the 3D item 199 computed by the dimensioner 115 may thus be communicated, via the interface 119 of the camera 11, to the projector 12.

The scanner 112 is operable for the scanning of the FOV 150 based on an optical data signal input, which is received from the sensors 116. The view mapper 111 is operable for the mapping of the FOV 150 based on a data signal input corresponding to an output of the scanner 112. The mapped FOV 150 comprises three dimensions, which are each oriented orthogonally in relation to each of the others, and graduated according to the linear scale thereof. For example, the orthogonally related dimensions may each be disposed along an axis of a 3D coordinate system. The axes may correspond respectfully to vertical, horizontal, and depth dimensions of the 3D system.

The surveyor 113 is operable for identifying 2D surfaces and edges of the scanned item 199. The dimensioner component 115 is operable for measuring dimensions of the identified surfaces and edges of the scanned item in relation to the linear graduation scale of the three dimensions of the mapped FOV 150. The dimensioner 115 is operable for computing a measurement corresponding to the detected 2D surface of the scanned item 199. The measurement may be computed relative to the graduated scale of the dimensions of the mapped FOV 150.

The surveyor 113 identifies the surface of the scanned item 199 by detecting the surface and its edges, and orienting the detected surface and edges, relative to, e.g., at least two of the three spatial dimensions of the mapped FOV 150. The dimensioner 115 provides the measured dimensions to the image processor 117, the camera interface 119. The dimensioner 115 may also provide the measured dimensions to the modeler 114.

The modeler 114 is operable for texture mapping a model 161 of the scanned item 199 within a virtual 3D space 160. The virtual 3D space 160 is computed to scale and correspond spatially to the mapped FOV 150. The modeler 114 texture maps the detected surface of the scanned 3D item 199 as a corresponding 2D surface of the model 161 within the virtual 3D space 160 based on the orientation of the detected surface relative to the at least two dimensions of the mapped FOV 150.

The modeler 114 may be configured, programmed and/or disposed to comprise a component or the camera 11, of the projector 12, or of both the projector 12 in part and the camera 11 in part. For example, the image processor 117 (or another component of the camera 11), or the DLP 125 (or another component of the projector 12) may be operable for performing or executing one or more functions of the modeler 114. Thus, a first of a plurality of functions may execute in the camera 11, and a second of the modeling functions may execute in the projector 12. Data relating to a function of the modeler 114 may be communicated, via the interface 119 of the camera 11, to the projector 12. For example, the dimensioner 115 may communicate the dimensions measured for each of the 2D surfaces of the 3D item 199 measured by the dimensioner 115 may be communicated to the projector 12.

The scanner 112, view mapper 111, surveyor 113, dimensioner 115, and modeler 114 are operable together for exchanging data signals. The data signals exchanged between these components comprise projection angle information, with which embodiments of the present invention are operable for preventing the representation 122 projected onto the surface of the item 199 at angles that may skew the appearance thereof, or otherwise render the representation as other than optimally readable or viewable.

Using the projection angle information, the system 10 is operable for computing incident and normal angles for a perspective based 3D projection of the dimensional representation 122 at each of the respectively corresponding 2D surfaces. The incident and normal angles may be computed in relation to an examination of a texture based depth map produced by components of the camera 11, which operate together for mapping the FOV 150 in the three orthogonal dimensions, including the depth related dimension thereof.

The projection angle information is used to create translation matrices, which are applied in relation to all graphics, including the dimensional representation 122, which are to be rendered by perspective based 3D projection on respectively corresponding 2D surfaces of the item 199. Using the translation matrices, the representation 122 (and other graphics) are rendered to appear as if projected directly above each respective corresponding surface (along the normal line) of the item 199 for optimum legibility, maximum readability and minimum apparent visual distortion.

In example embodiment of the present invention, texture mapping is used for mapping 2D image data comprising alphanumeric, ideographic, and/or pictographic text and graphics of the dimension measurement representation 122 onto each of the respectively corresponding 2D surfaces of the 3D model 161. An example embodiment may be implemented in which the texture mapping technique relates to a technique described further, below. The projector 12 renders the dimensional representation 122 with minimal distortion and maximum legibility.

The 3D model 161 comprises instructions, according to which the projector 12 is controlled to render the projection 127 of the measurement representation 122 onto each of the respective corresponding surfaces of the item 199. The instructions are operable for preserving a correct perspective in the rendered representation 122. The projector 12 is thus operable for rendering the representation 122, with correct spatial perspective preserved (and e.g., independent of orthographic projection strictures), onto the respective corresponding 2D surfaces of the 3D item 199.

An example embodiment may be implemented in which at least a first edge and a second edge of the detected 2D surface are delineated, and in which the detected 2D surface comprises a first of at least three detected 2D surfaces of the scanned item 199. Further, a second 2D surface and a third 2D surface of the scanned item 199 are detected. The second 2D surface shares the delineated first edge, and the third 2D surface shares the second delineated edge, with the first detected 2D surface of the scanned 3D item 199.

The orientation related operations of the surveyor 113 may comprise, further, orientating each of the detected second 2D surface and the detected third 2D surface of the scanned item 199, relative to the at least two of the three spatial dimensions of the mapped FOV 150.

The modelling related operations of the modeler 114 may comprise, further, texture mapping the model of the scanned 3D item 199 based on the orientation of each of the detected second 2D surface and the detected third 2D surface of the scanned 3D item 199.

The dimensioning operations of the dimensioner 115 may comprise computing a measurement corresponding to each of the detected first, second and third 2D surfaces of the scanned 3D item 199, relative to the graduated scale of the dimensions of the mapped FOV 150, based on the texture mappings of the detected first, second and third 2D surfaces in the model 161.

The representation 122 of the measured dimension is rendered onto the 2D surface of the scanned 3D item 199 to which it corresponds in a perspective based 3D projection. The dimensional representation 122 of the measurements computed for each of the first, second, and third detected 2D surfaces, onto each of the corresponding surfaces of the scanned 3D item 199. Correct spatial perspective is thus preserved in each.

The camera 11 comprises an image processor 117, operable for processing an image input received from optically active sensors 116. The image processor 117 may also share image related data signals with the surveyor 113 and receive dimension related signals from the dimensioner 115.

The image processor 117 generates data comprising a captured image 188 of the item 199, an instance of which may be stored in one or more non-transitory computer readable storage media 118. The captured image of the 3D item 199 may comprise the dimensional representation 122 of the measurements, rendered by perspective based 3D projection onto each of the respectively corresponding 2D surfaces thereof.

The image storage media 118 may comprise memory, flash or other physical data storage media. The image processor 117 may also share an instance captured image of the scanned item 199 with an interface 119. The interface 119 is operable for accessing an output of the camera 11.

The interface 119, for example, may receive a data signal from the modeler 114 corresponding to the computed 3D model 161. The interface 119 provides the data signal corresponding to the 3D model 161 as an output of the camera 11. In another example, the interface 119 may receive a data signal from the surveyor 113 and the dimensioner 115 relating to the measurements of the 2D surfaces, edges, and corresponding orientations within the FOV 150. The interface 119 may provide the data signal corresponding thereto the 3D model 161 as an output of the camera 11. The output of the camera 11, comprising the 3D model 161, is provided through the interface 119 to the projector 12.

The projector 12 comprises an interface 129, which is operable for receiving input signals. The input signals may comprise the texture mapped image data provided by the modeler 114. The input signals comprise instructions, with which the projector 12 is controlled by the camera 11 for operably rendering the perspective based 3D projection 127 of the dimensional measurement representation 122 onto each of the respectively corresponding 2D surfaces of the 3D item 199. Implemented with the modeler 114 disposed as a component and/or functionality of the projector 12, the input signals may comprise the measurements of the 2D surfaces, edges and corresponding orientations within the FOV 150 and used by the modeler for computing the 3D model 161.

Based on the 3D model 161, the projector 12 is operable for rendering the dimensional representation 122, with correct spatial perspective preserved, without an orthographic projection stricture, onto the respective corresponding 2D surfaces of the 3D item 199. A perspective based 3D projection is thus rendered of the dimensional representation 122 onto the respectively corresponding 2D surfaces of the 3D item 199.

The projector 12 comprises a digital light processor (DLP) 125. The DLP 125 may comprise a microprocessor and is operable for controlling optical device drivers 124 and scan drivers 126. In response to programming and/or control instructions, the DLP 125 may control the projector 12 in the rendering of the perspective based 3D projection of the dimensional representation 122 onto the respectively corresponding 2D surfaces of the 3D item 199 based on the 3D model 161.

The optical device drivers 124 are operable for driving an array 123 of optically active devices. The optical array 123 comprises an array of light emitting diode (LED) devices or laser diode (LD) devices. The LED/LD driver 124 triggers each of the LED/LD devices of the LED/LD array 123 selectively, individually and/or addressably to emit light under modulation by the DLP 125 through the optical drivers 124.

The scan drivers 126 are operable for driving an optical rasterizer or other optical scanner device 122. The rasterizer 122 may comprise an array of electro-optically and/or electromechanically activated filters, lenses, mirrors or other elements. The rasterizer 122 is operable for rendering an output of the projector 12 in the projection beams 127. The projection beams 127 are projected through lenses, windows, and other passive optical devices 121 onto a projection target, which in example embodiments comprises the scanned item 199. The projection beams 127 are operable for rendering a perspective based 3D display of the representation 122, such as with illuminated graphics, on to each of the respectively corresponding 2D surfaces of the scanned 3D item 199.

In an example embodiment of the present invention, the camera 11 captures an image ("images") the scanned 3D item 199 in real time with the 3D projection of the dimensional representation 122 onto each of the respectively corresponding 2D surfaces thereof by the projector 12. The images of the item 199 thus comprise the rendered dimensional representation 122.

An example embodiment may be implemented in which outputs of the camera 11 also comprise data signals corresponding to instances of captured images. The output instances of the images 188 of the scanned 3D item 199 comprise the dimensional representation 122 rendered with correct perspective on the respectively corresponding 2D surfaces thereof.

In an example embodiment, the imaging system 100 may further comprise a computer component operable for processing images of the scanned item 199, the captured image comprising the rendered dimensional representation 122. The image processing computer is operable for performing at least one action based on the dimensional representation 122 of the measured dimension, rendered on the identified surface of the scanned item in the processed image instance. For example, the image processing computer may be operable for billing a fee related to shipping, storing, moving, or transporting the scanned item 199. The billed fee may be based on the measured dimensions thereof, as shown in the instance of the captured image 188 thereof.

Example Texture Mapping Techniques

An example embodiment is implemented using texture mapping. A texture corresponding to a 2D image of the representation 122 is projected onto a surface of the physical 3D item 199. The projected image may be generated in relation to a 2D source image, prepared in relation to graphic and textual expectations of dimensional representations of various cargo/inventory items.

Characteristics of surfaces of the scanned item 199, detected by the camera 11, are determined by the surveyor 113 and the dimensioner 115, and/or image processor 117. The modeler 114 computes the 3D model 161 based on the determined characteristics. The computations may comprise manipulations relating to imaging changes in surface features detected in the scan. The surface features may relate to one or more of luminance, luma, intensity or brightness; chrominance or chroma; specularity, roughness, bumpiness, or apparent surface granularity; apparent or actual incandescence or iridescence; and/or transparency or opacity, and perspective quality.

An example embodiment is implemented in which a corresponding relationship is computed between the item 199 and a 2D image of the dimensional representation 122. The modeler 14 applies the texture mapping to the 3D model 161 computed in relation the item 199. Texture mapping coordinates are computed in the virtual texture space 160. The computed texture mapping coordinates are represented as values on a rectangular patch. A correspondence is computed between the surfaces of the 3D item 199 and 2D rectangular patches of each of the respective dimensional representations 122. The computed correspondence applies the texture mapped model 161 to the scanned item 199.

Polygons typically comprise a number of arbitrary vertices. The 3D items 199 may comprise boxes, crates and other packages, which may conform to cubes or other rectangular prisms or other geometrically solid shapes. The 2D surfaces of the 3D items conform to 2D polygons, such as rectangles of cubic items and rectangular prisms. The computed texture coordinates may be mapped to each vertex of the polygons characterizing the 3D item 199. The 2D texture is mapped onto the surfaces of 3D objects conforming to conjoined planes, cubes, rectangular prisms, cylinders, spheres, obloids, and other simple 3D geometric shapes ("solids") to compute the texture mapped 3D model 161. Based on the texture mapped 3D model 161, the respective dimensional representations 122 are each mapped to the corresponding physical 2D surfaces of the 3D item 199 and the perspective based 3D projection computed accordingly.

For example, the texture mapped 3D model 161 may be subdivided into multiple constituent parts. Each of the parts is then mapped, individually in relation to the other parts, but all using a single map based on a coordinate system (U,V). The (U,V) coordinates of a non-uniform rational B-spline (NURBS) surface, comprising a substantially rectangular surface patch, may be used for coordination of the texture mapping.

The mapping of each part may be computed in relation to a projection of the representation 122 onto each respective, corresponding surface of the item 199 that best preserves perspective. While orthographic projections may sometimes be operable, example embodiments may also use cubic, cylindrical, spherical, and/or other models.

As used herein, the term 'texel' ("texture element") refers to elemental, or atomic area components in an image texture map. Texels comprise the smallest square areas used in texture mapping the image. Multiple texels may be mapped to a single pixel (picture element) of the image.

To avoid aliasing related to color-based point sampling, texel color values may be filtered using chromatic averaging. A perspective view image of a planar checkerboard pattern, for example, may comprise numerous source texels. Determining appropriate color values for each pixel of the image may be computationally expensive in terms of time and computational resources. Mip-mapping may be used to pre-filter the composite textures.

For example, the image may be texture mapped over multiple image copy iterations or instances derived from a single scan of the target item 199. In each of the multiple iterations/instance, copies of a base image, captured originally, may be averaged down to progressively lower resolutions. Each progressive iteration/instance of the image in the averaging sequence may comprise half (or some other significant fractional value) of a previous image iteration/instance in the sequence.

The modeler 114 computes pre-filtered mip-mapped textures prior to the rendering of the representations 122. In computing the rendered dimensional representations 122, appropriate texture image levels are selected from among the pre-filtered mip-mapped textures. The levels may be selected based on how obliquely (e.g., relative to alignment with the computed normal angle) the surfaces of the scanned item 199 appear, as viewed within the mapped FOV 150. Perspective based 3D projections are computed for rendering the representations 122 onto the respective corresponding surfaces of the item. Factors may also be computed in relation to capturing an image instance of the scanned item photographically and/or rendering the captured image on various electronic displays. For greater distances between the scanned item 199 and the camera 11 or the projector 12, and/or greater obliqueness in the normal angle computed for a particular one of the surfaces, a selected texture may be selected for a lower resolution and/or a somewhat blurrier or fuzzier appearance.

To minimize latency associated with rendering related computations, the mip-mapping may be based on textures that conform to substantially square configurations. Black borders with zero (or near zero) chromatic values may be added to texels to synthesize substantially square texels. Multiples of two (e.g., 256×256, 512×512, 1024×1024, etc.) may be used in computing the mip-maps to achieve best resolutions over the sequence of image iteration/instances.

Bump mapping may be used to disturb normal vectors associated with surfaces of polygonal items, which imparts a bumpy appearance to the surfaces. A procedure may be used to disturb the surface normal at each point on the surface. The procedure may be computed based on scalar map comprising single values in a 2D array. The procedure may be computed based on an algorithm related to a set of equations and/or instructions.

The bumpiness may not be apparent in. Thus, Displacement mapping may also be used, e.g., where silhouette profile edges of imaged objects lack significant apparent bumpiness. The displacement mapping changes the position and surface normal at each point on the surfaces, which renders a silhouette of the objects bumpy as well.

An example texture mapping technique is described in the article entitled "Mapping Techniques," posted by the Ohio State University on the Worldwide Web (WWW) with the uniform resource locator (URL) associated with the following link:

http://accad.osu.edu/~midori/Materials/texture_mapping.htm and incorporated by reference for all purposes, as if fully set forth herein.

Upon mapping the textures, an example embodiment computes a perspective based 3D projection of each 2D surface of the virtual model 161. The 2D graphics of the dimensional representations 122 are projected onto the respectively corresponding surfaces of the 3D item 199, free of significant perspective related distortions. In an example embodiment, the camera 11 controls the projector 12 to render the dimensional representation 122 onto each of the respectively corresponding 2D surfaces of the 3D item 199 based on the computed perspective based 3D projection.

Example 3D Projection Techniques

An example embodiment is implemented in which the computed perspective based 3D projection maps 3D points over planes corresponding to each of the 2D surfaces of the scanned item 199. While orthographic projection uses a set of transforms for scaling projected images that may symbolize a 3D character of objects, they typically do not represent an object as it would be viewed directly or recorded photographically, such as from directly overhead.

For example, parallel lengths at all points in orthographically projected images have the same scale, notwithstanding the distance of the imaged item from the imager. This scalar sameness perturbs the perspective of the captured image relative to the imaged item. For example, lengths near to the imager may appear to have excessive length in relation to a correct viewing perspective, which can degrade the clarity or legibility of the projected graphics.

Example embodiments are implemented in which perspective based 3D projection is used to improve the clarity, legibility and readability of the rendered dimensional representation 122, as it is projected onto the 3D item 199. Perspective based 3D projection transformations are computed based on a position and orientation of the camera 11 and the FOV 150 relative to the scanned item 199. The computed 3D projection transformations allows each of the respective representations 122 to be rendered onto the corresponding 2D surfaces of the scanned item 199 as though projected in alignment with the computed normal angles thereof and thus, as though projected directly overhead therefrom.

The perspective projection transformation may be associated with the camera 11 and thus, the system 10 and the projector 12, with which the camera 11 may be disposed and/or deployed (e.g., as shown in FIG. 1). An example embodiment may be implemented in which the projector 12 is deployed, disposed, or used at or in a location, separated by at least some displacement and/or orientation, relative to a location of the camera 11. Correction values may thus be computed in relation to compensating for the separated displacement/orientation in computations of the perspective projection transformation, and exchanged between the camera and the projector 12.

An example embodiment may be implemented in which the perspective projection transformation is computed in relation to a set of variables: $a_{x,y}$, $c_{x,y}$, $\theta_{x,y}$, and $e_{x,y}$. The variables:

a. $a_{x,y}$, represents a position in 3D space of a point A that is to be projected;

b. $c_{x,y}$, which represents a position in 3D space of the camera 11;

c. $\theta_{x,y}$, which represents a Tait-Bryan (or not dissimilar Euler type) angular orientation of the camera 11 in 3D space of a point A that is to be projected; and d. $e_{x,y}$, which represents an image capture perspective, e.g., of the image instance 188. The image capture perspective $e_{x,y}$ passes through a point of the camera 11 in the 3D space and may thus be conceptualized in relation to a viewer using a viewfinder associated with the camera 11.

A 2D projection, $b_{x,y}$ of the position a, results. For values of the position $c_{x,y}$ equal to <0,0,0> and $\theta_{x,y}$ equal to <0,0,0>, a 3D vector <1,2,0> is projected to the 2D vector <1,2>. For other values of the position $c_{x,y}$ and the angle $\theta_{x,y}$, the 2D projection $b_{x,y}$ is computed by defining a vector $d_{x,y}$ in relation to the point A, relative to a coordinate system defined by the camera 11, with an origin at the point C and rotated by the angle θ in relation to the FOV 150.

A transform associated with the camera 11 is computed according to the Equation 1, below (or an algorithm not dissimilar thereto) for the points A, B and C.

$$\begin{bmatrix} d_x \\ d_y \\ d_z \end{bmatrix} = \begin{bmatrix} 1 & 0 & 0 \\ 0 & \cos(-\theta_x) & -\sin(-\theta_x) \\ 0 & \sin(-\theta_x) & \cos(-\theta_x) \end{bmatrix}$$
$$\begin{bmatrix} \cos(-\theta_y) & 0 & \sin(-\theta_y) \\ 0 & 1 & 0 \\ -\sin(-\theta_y) & 0 & \cos(-\theta_y) \end{bmatrix} \begin{bmatrix} \cos(-\theta_z) & -\sin(-\theta_z) & 0 \\ \sin(-\theta_z) & \cos(-\theta_z) & 0 \\ 0 & 0 & 1 \end{bmatrix}$$
$$\left( \begin{bmatrix} a_x \\ a_y \\ a_z \end{bmatrix} - \begin{bmatrix} c_x \\ c_y \\ c_z \end{bmatrix} \right)$$
(Equation 1.)

Equation 1, effectively, subtracts the variable c, representing the 3D position of the camera 11, from the variable a, representing the 3D positions corresponding to the points being projected, and rotates the resulting remainder by a negative value corresponding to the angle θ.

The projector 12 renders the representation 122, according to the computed set of the transformed points, onto each of the corresponding planar 2D surfaces of the item 199. Example perspective based 3D projection techniques, with which aspects of example embodiments may be implemented, are described in the article "3D Projection," a Wikipedia entry available on the WWW and accessible at the URL associated with the link:

http://en.wikipedia.org/wiki/3D_projection and, which is incorporated by reference for all purposes as if fully set forth herein.

Example Processes

Figure 4:
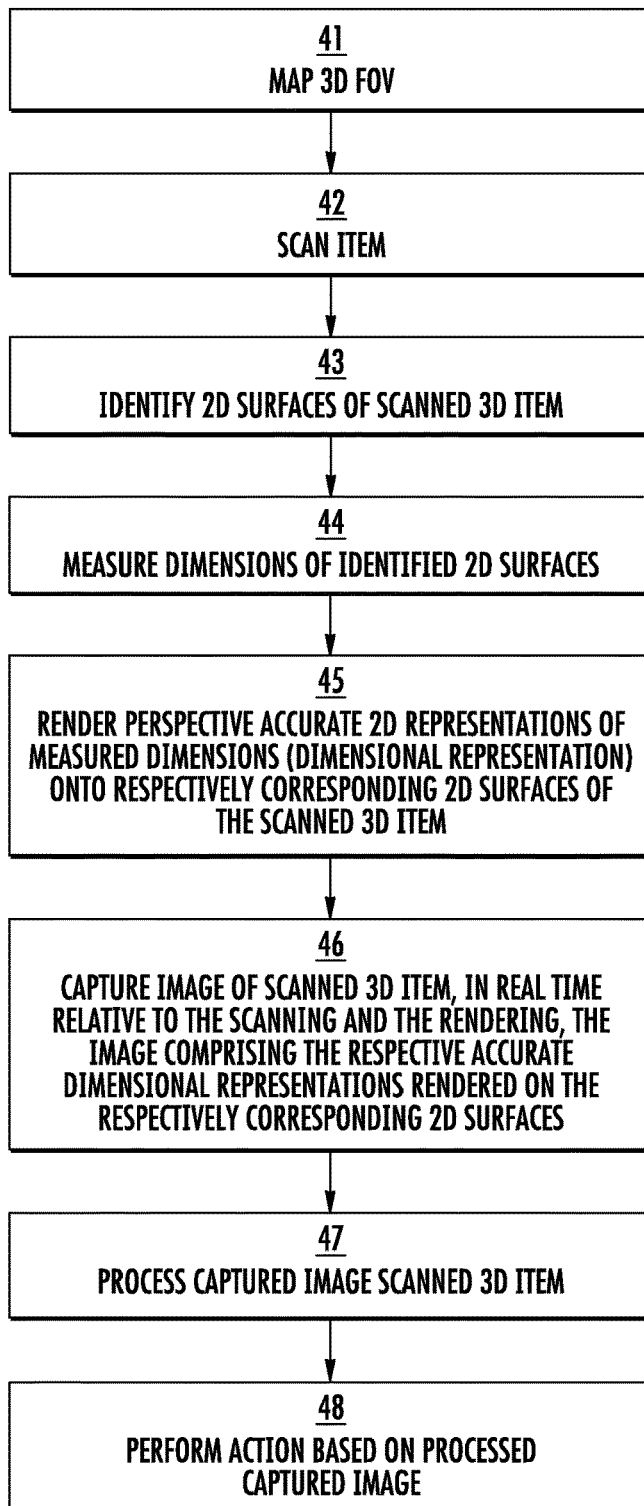
FIG. 4 depicts a flowchart for an example item process for imaging an item, according to an embodiment of the present invention.

FIG. 4 depicts a flowchart of an example process 40 for dimensioning a 3D item, according to an embodiment of the present invention. In a step 42, the 3D item is scanned.

The scanning of the 3D item in step 42 may comprise, or be preceded by a step 41, in which the FOV of the imager is mapped. The mapped FOV comprises three spatial dimensions, each of which is oriented orthogonally in relation to each of the others and graduated according to a linear scale, e.g., axes graduated according to the linear scale and disposed at right angles relative to each other.

In step 43, 2D surfaces of the scanned 3D item are detected, identified, and oriented relative to the mapped FOV. In step 44, dimensions of the identified 2D surface of the scanned 3D item are measured.

In step 45, representations of the measured dimensions are rendered in real time (or near real time) relative to the scanning of the item. The dimensional representations are rendered without significant spatial distortion, onto the respective, corresponding identified 2D surfaces of the scanned 3D item. Example embodiments may be implemented in which step 45 comprises a perspective based 3D projection technique.

Figure 5:
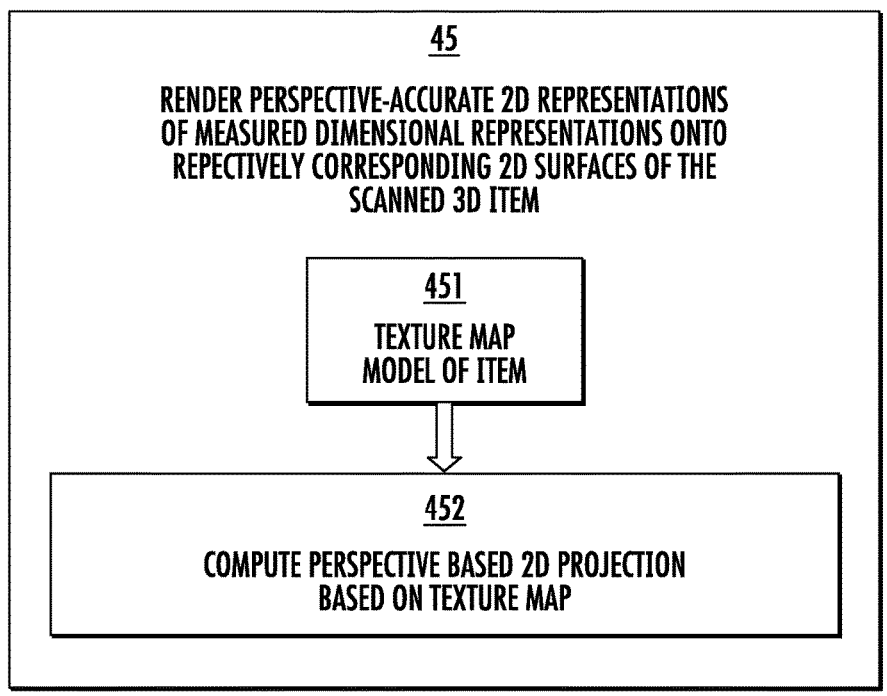
FIG. 5 depicts a flowchart of an example step in the dimensioning and imaging process, according to an embodiment of the present invention.

FIG. 5 depicts a flowchart of the step 45, according to an example embodiment of the present invention. In step 451, a model of the scanned physical 3D item is texture mapped in a virtual 3D space. In step 452, a perspective based 3D projection of the dimensional measurements onto is computed based on the texture mapped model. The dimensional representations are thus projected onto the respective, corresponding identified 2D surfaces of the scanned 3D item in real time (or near real time) as the item is scanned.

Referring again to FIG. 4, process 40 continues with a step 46, in which an image of the scanned 3D item is captured. The image is captured in real time, relative to the perspective based 3D projection of the dimensional representation onto its respectively corresponding 2D surfaces. The captured real time image thus comprises the representation of the measured dimension, rendered with the perspective based 3D projection onto the identified 2D surface of the scanned 3D item. The dimensional representations may be presented with associated graphical representations relating to the computed volume and/or detected weight of the item.

The captured image of the scanned item, comprising the representation of the dimension measurement, volume, and weight, may then be processed further and/or used in other processing operations. For example, an example embodiment may be implemented in which the captured image, is used in an application relating to logistics and/or commerce.

An example embodiment may be implemented in which the captured image, with the dimension related representation, may be sent by a dimensioner over a data network to another computer. The dimensioner or the other computer may perform an action based on the representation of the measured dimension rendered on the identified surface of the scanned 3D item.

Figure 6:
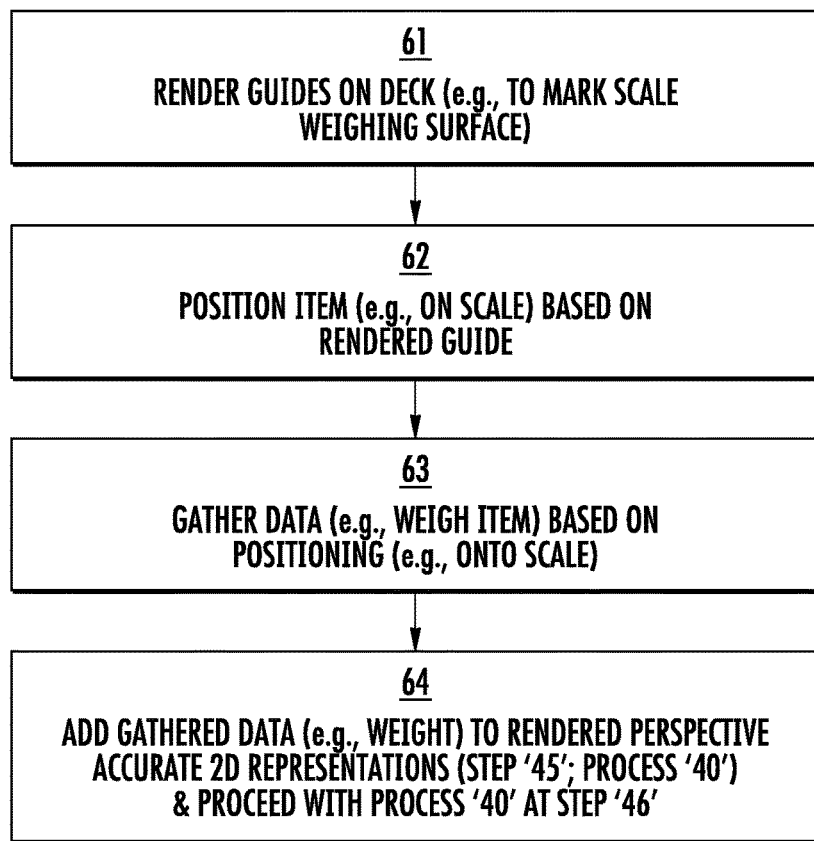
FIG. 6 depicts a flowchart of an example process for a using data projected onto the item, according to an embodiment of the present invention.

The captured image, with the dimension related representation, may thus be used to compute or verify charges (such as rent and/or shipping fees) to be charged or resolved in relation to storing an inventory item or transport of a cargo item. The rent or fees may correspond to a size, area or volume associated with the dimension and its rendered representation FIG. 6 depicts a flowchart of an example process 60 for a using data projected onto the item, according to an embodiment of the present invention.

In step 61, guides are rendered on a deck, floor, or other working surface (deck 19; FIG. 1) in a logistic, transport, storage, or commercial milieu, setting or environment in a particular location (e.g., 188). For example, the projector may project delineations, targets or other guides to mark an active target-weighing surface of a scale (185) embedded in the deck.

In step 62, the item may be positioned, by automated means or manually, based on the rendered guides. For example, the item may be positioned on the weighing surface of the scale based on the delineations projected on the corresponding portion of the deck.

In step 63, data is gathered based on the positioning. For example, the scale weighs and records a weight for the item.

In step 64, the gathered data is added to the rendered perspective-accurate 2D representations projected onto the item per step 45 of Process 40 (FIG. 4, FIG. 5).

Example Computer System and Network

Figure 7:
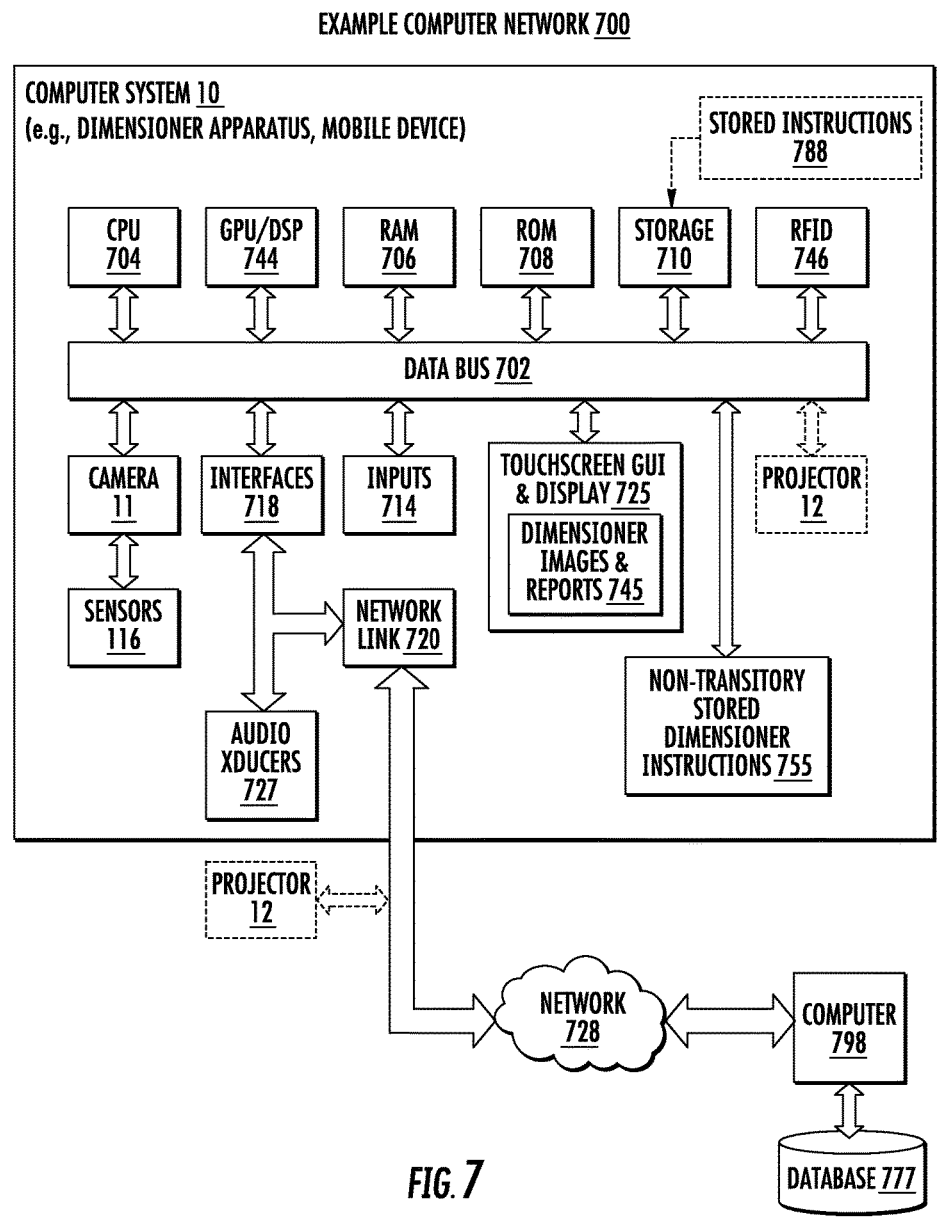
FIG. 7 depicts an example dimensioning and imaging system, which is operable for dimensioning and imaging the item, according to an embodiment of the present invention.

FIG. 7 depicts an example computer network 700, according to an embodiment of the present invention. The computer network comprises a data network 728. The dimensioner and imager system comprises a first computer system, which is coupled communicatively to the data network 728. At least a second computer 798 may also be coupled communicatively to the data network 728.

The dimensioner and imager system 10 comprises the camera 11. The dimensioner and imager system 10 may also comprise the projector 12, disposed or deployed together with the camera 11 in a unitary apparatus or housing. Example embodiments may also be implemented in which the projector 12 is disposed or deployed in a separate location from a housing of the dimensioner and imager system 10 in which the camera 11 is disposed. The projector 12 may be communicatively coupled to the dimensioner and imager system 10 via the network 728 and interfaces 718 and the network link 720.

The dimensioner/imager system 10 is configured operably (e.g., by software code with which it is programmed) as a dimensioner. The dimensioner 10 may comprise a mobile device such as a tablet computer, portable data terminal (PDT), smartphone, portable (or personal) digital assistant (PDA) and/or another mobile or portable computing apparatus. The dimensioner 10 may also comprise a fixed or substantially stationary computer system or component thereof.

The dimensioner 10, including the projector 12, may be deployed, disposed, and operated in a fixed location. The fixed location may be disposed in proximity to a site associated with a storage or transport related portal. The storage or transport portal may be associated with a logistic, commercial, industrial, agricultural, military, laboratory (e.g., certification) setting or another facility.

The dimensioner 10 is operable for dimensioning 3D inventory/cargo items. A FOV is mapped over three spatial dimensions, each of the three spatial dimensions oriented orthogonally in relation to each of the other spatial dimensions and graduated according to a linear scale. The 3D item is scanned relative to the mapped FOV. Each of the 2D surfaces of the scanned 3D item is identified. A dimension is measured for each of the identified 2D surfaces of the scanned 3D item. The dimensioner 10 is operable with the projector 12 for rendering perspective-corrected representation of the measured dimension, in real time or near real time, with respect to the measuring the dimension step, onto each of the identified 2D surfaces of the scanned 3D item.

The dimensioner 10 is operable for communicating with other devices, such as the at least one computer 798. The dimensioner 10 is coupled communicatively via the network 728 with the computer 798. The network 728 may comprise a packet-switched data network operable based on transfer control and internetworking protocols (e.g., TCP/IP).

The data network 728 may comprise a portion of one or more other networks and/or two or more sub-network ("subnet") components. For example, the data network 728 may comprise a portion of the internet and/or a particular wide area network (WAN). The network 728 may also comprise one or more WAN and/or local area network (LAN) subnet components. Portions of the data network 728 may be operable wirelessly and/or with wireline related means. The data network 728 may also comprise, at least in part, a digital telephone network.

The at least second computer ("computer") 798 may comprise a desktop, workstation or other computer implementation located at a particular location, where it may be disposed in a more or less fixed, or at least stationary position or configuration. The computer 798 may also be a mobile device. In relation to the dimensioner 10, the computer 798 may also be operable as a server and/or for performing one or more functions relating to control or centralized pooling, processing or storage of information gathered or accessed therewith, e.g., with a database 777.

For example, embodiments of the present invention may be implemented in which the dimensioner 10 is operable for sending reports 745 relating to data corresponding to the dimensional measurements and/or captured images of the scanned items to the computer 798 over the network 728. The computer 798 may then store the image dimensional representation related data in the database 777, from which it may be retrieved at a later time. The data retrieved from the database 777 may be used in computing other information, such as for billing rents for storage and/or shipping fees for transport of the scanned items.

The dimensioner 10 may also be operable for capturing other images photographically (including recording video) and/or scanning and reading barcode patterns and other data presented by graphic media. The dimensioner 10 may also comprise a component 746, which is operable for scanning RF identification (RFID) tags and processing data associated therewith.

The images and data associated with the barcode and/or RFID tags may be sent to the computer 798. In addition to dimensioning the items and capturing and evaluating images thereof, the dimensioner 10 may also use scanned barcodes (and RFIDs) for reading data (e.g., inventory information, price, etc.) therefrom in relation to associated items (e.g., packages, stock, products, commodities, parts, components, etc.).

The dimensioner 10 may send dimensional measurements, captured images, and related data in the reports 745, data relating thereto, and/or the barcode and RFID scan related data to the computer 798 over the network 728 wirelessly, via the network 728, to the computer 798 for further processing.

Upon receipt thereof, the computer 798 may be operable for processing the data related to the images, and thus comprising the dimensional representations rendered on the 2D surfaces of the item using perspective based 3D projection, evaluations thereof, and any barcode/RFID scan related data.

The scan data may comprise the captured images, and thus also comprising the dimensional representations rendered on the 2D surfaces of the item using perspective based 3D projection. For example, the scan data may relate to the captured images, measurements associated therewith in relation to the surface dimensions thereof, volumes computed therewith, weights added, e.g., by a scale, and/or surveys of boundaries or other information related to surface features of an item.

The dimensional measurements, other scan data and captured imaged associated therewith may relate to commercial transactions relating to the transport and/or storage of an item. The scan data may also relate to a sale, transfer or other disposition of the item and associated with the barcode or RFID tag. The processing of the data may thus allow, for example, updating the database 777 in relation to inventory, tracking shipments, etc.), based on the image evaluation and other aspects of the item associated with the scanned surface features and the barcodes (or RFID tags).

The dimensioner 10 comprises a plurality of electronic components, each of which is coupled to a data bus 702. The data bus 702 is operable for allowing each of the multiple, various electronic components of the dimensioner 10 to exchange data signals conductively with each of the other electronic components thereof.

The electronic components of the dimensioner 10 may comprise IC devices, including one or more microprocessors. Electronic components of the dimensioner 10 may also comprise other IC devices, such as a microcontroller, FPGA or other PLD, or ASIC.

The microprocessors (and/or other electronic components) include a central processing unit (CPU) 704. The CPU 704 is operable for performing general data processing functions related to operations of the dimensioner 10. The electronic components of the dimensioner 10 may also comprise one or more other processors 744. The other microprocessors may also include a graphics processing unit (GPU) and/or digital signal processor (DSP) 704, which are each operable for performing data processing functions that may be somewhat more specialized than the general processing functions, as well as sometimes sharing some of the general processing functions with the CPU 704.

One of the processors 744 may also be operable as a "math" (mathematics) coprocessor. The math co-processor, DSP and/or GPU ("DSP/GPU") 744 are operable for performing computationally intense data processing. The computationally intense processing relates to imaging, graphics, texture mapping, perspective based 3D projection, image evaluation, graphics, dimension measurements, wireframe manipulations, coordinate system management, logistics, and other (e.g., mathematical, financial) information.

An example embodiment may be implemented in which the DLP 125 (FIG. 3) of the projector 12 also comprises one or more microprocessors, which are operable with CPU and/or GPU/DSP processing functionality. Computations performed by the DLP 125 allow the projector 12 to render the dimensional representations as 2D graphics by perspective based 3D projection onto the 2D surfaces of the 3D object.

The data processing operations comprise computations performed electronically by the CPU 704, DLP 125, and the DSP/GPU 744. For example, the microprocessors may comprise components operable as an arithmetic logic unit (ALU), a floating point logic unit (FPU), and associated memory cells. The memory cells comprise non-transitory data storage media, which may be configured as caches (e.g., "L1," "L2"), registers, latches and/or buffers. The memory cells are operable for storing data electronically in relation to various functions of the processor. For example, a translational look-aside buffer (TLB) may be operable for optimizing efficiency of use of content-addressable memory (CAM) by the CPU 704 and/or the DSP/GPU 744.

The dimensioner 10 also comprises non-transitory computer readable storage media operable for storing data, e.g., electronically. For example, the dimensioner 10 comprises a main memory 706, such as a random access memory (RAM) or other dynamic storage device 706. The main memory 706 is coupled to data bus 702 for storing information and instructions, which are to be executed by the CPU 704. The main memory 706 also may be used for storing temporary variables or other intermediate information during execution of instructions by the CPU 704. Other memories (represented in the present description with reference to the RAM 706) may be installed for similar uses by the DSP/GPU 744. Example embodiments may be implemented in which the camera 11 and/or the projector 12 each also comprise the non-transitory computer readable storage media.

The dimensioner 10 further comprises a read-only memory (ROM) 708 or other static storage device coupled to the data bus 702. The ROM 708 is operable for storing static information and instructions for use by the CPU 704. In addition to the RAM 706 and the ROM 708, the non-transitory storage media of the dimensioner 10 may comprise at least one data storage device 710. The data storage device 710 is operable for storing information and instructions and allowing access thereto.

The data storage device 710 may comprise a magnetic disk drive, flash drive, or optical disk drive. The data storage device 710 comprises non-transitory media coupled to data bus 702, and may be operable for providing a "virtual memory" function. The virtual memory operations of the storage device 710 may supplement, at least temporarily, storage capacity of other non-transitory media, such as the RAM 706

Example embodiments may be implemented in which the camera 11 and/or the projector 12 also each comprise RAM, ROM and other memories, storage devices and/or other non-transitory computer readable storage media.

The non-transitory storage media of the dimensioner 10, camera 11 and/or projector 12 also comprises instructions ("dimensioner instructions") 755, which is stored (e.g., electronically, magnetically, optically, physically, etc.) in relation to software for programming, controlling, and/or configuring operations thereof.

The operations relate to dimensioning scanned 3D items. A FOV is mapped over three spatial dimensions, each of the three spatial dimensions oriented orthogonally in relation to each of the other spatial dimensions and graduated according to a linear scale. The 3D item is scanned relative to the mapped FOV. Each of the 2D surfaces of the scanned 3D item is identified. A dimension is measured for each of the identified 2D surfaces of the scanned 3D item. A perspective-corrected representation of the measured dimension is rendered, in real time or near real time, with respect to the measuring the dimension step, onto each of the identified 2D surfaces of the scanned 3D item.

Non-transitory programming instructions, software, settings and configurations related to the evaluation of images are stored (e.g., magnetically, electronically, optically, physically, etc.) by a memory, flash, or drive related non-transitory storage medium 755 and/or with the non-transitory storage medium 710. The non-transitory storage medium 710 may also store a suite 788 of instructions, which relate to a suite of other functional features with which the dimensioner 10 may also be also operable, e.g., for performing other functional features.

An example embodiment may be implemented in which the suite 788 of features relates to applications, tools and tool sets, menus (and sub-menus) and macros associated with functions of dimensioner 10 related to capturing and evaluating images. The suite 788 may also relate to scanning and reading barcode patterns and RFID tags, taking photographs, recording video and/or audio information, telephonic operations, and capturing other data related to images and presentations of graphic media and other information sources.

The dimensioner 10 comprises a user-interactive touchscreen 725, which is operable as a combined graphical user interface (GUI) and display component 725. The touchscreen 725 may comprise a liquid crystal display (LCD), which is operable for rendering images by modulating variable polarization states of an array of liquid crystal transistor components. The touchscreen 725 also comprises an interface operable for receiving haptic inputs from a user.

The haptic interface of the GUI touchscreen 725 may comprise, e.g., at least two arrays of microscopic (or transparent) conductors, each of which is insulated electrically from the other and disposed beneath a surface of the display 725 in a perpendicular orientation relative to the other. The haptic inputs comprise pressure applied to the surface of the touchscreen GUI 725, which cause corresponding local changes in electrical capacitance values proximate to the pressure application that are sensed by the conductor grids to effectuate a signal corresponding to the input.

In an example embodiment, the touchscreen GUI and display component 725 is operable for rendering graphical instances of the reports 745. The image evaluation reports 745 are rendered by the display 725 upon receipt of data related to the dimensional measurements from the CPU 704 or the GPU/DSP 744.

The touchscreen GUI component 725 may be implemented operably for rendering images over a heightened (e.g., high) dynamic range (HDR), the rendering of the images may also be based on modulating a back-light unit (BLU). For example, the BLU may comprise an array of light emitting diodes (LEDs). The LCDs may be modulated according to a first signal and the LEDs of the BLU may be modulated according to a second signal. The touchscreen 725 may render an HDR image by coordinating the second modulation signal in real time, relative to the first modulation signal.

A plurality of inputs 714 may comprise one or more electromechanical switches, which may be implemented as buttons, escutcheons, or cursor controls. The inputs 714 may also comprise a keyboard. The keyboard may comprise an array of alphanumeric (and/or ideographic, syllabary based) keys operable for typing letters, number, and other symbols. The keyboard may also comprise an array of directional (e.g., "up/down," "left/right") keys, operable for communicating commands and data selections to the CPU 704 and for controlling movement of a cursor rendering over the touchscreen GUI display 725.

The directional keys may be operable for presenting two (2) degrees of freedom of a cursor, over at least two (2) perpendicularly disposed axes presented on the display component of the touchscreen GUI 725. A first 'x' axis is disposed horizontally. A second 'y' axis, complimentary to the first axis, is disposed vertically. Thus, the dimensioner 10 is thus operable for specifying positions over a representation of a geometric plane and/or other coordinate systems.

Audio transducers ("Xducers") 727 have a microphone function and a speaker function. The microphone function is operable for transducing speech and other sound into corresponding electrical signals, which may be accessed via an interface 718 and processed by one or more of the electronic components of the dimensioner 10. The speaker function is operable for transducing audibly signals accessed via the interface 718, which were generated by the electronic components. The audio transducers and associated interface 714 thus allow the dimensioner 10 to function telephonically and in response to audio user commands.

The dimensioner 10 may also be operable for scanning visual data such as barcode patterns and/or other images presented on printed graphic media and/or self-lit electronic displays. Example embodiments of the present invention also relate to the use of the dimensioner 10 for taking photographs and recording video. The camera 11 is coupled to the data bus 702. The camera 11 is operable for receiving data related to the scanned barcode patterns, as well as captured images.

The camera 11 is also operable for receiving static and dynamic image data related, respectively, to the photographs and the video. The 11 may receive the data captured from an image photosensor (e.g., sensor 116; FIG. 3). The image sensor may comprise an array of active optoelectronic devices such as CCDs, CIDs, CMDs, CMOS, PMOS, NMOS, or PD related imaging devices. The image sensor may be operable optically with a system of passive optical components (e.g., optics 101; FIG. 3). The dimensioner 10, the instructions 755, and the barcode scanning (and other) feature(s) of the system 10 are operable with one or more of the camera component 11, the image sensor component 116, and/or the optics 101.

The electronic components of the dimensioner 10 may also comprise an RFID scanner 746 coupled to the data bus 702. The RFID scanner 746 is operable for scanning RFID tags.

Execution of instruction sequences contained in the main memory 706 causes the CPU 704 to perform process steps associated with operations of the dimensioner 10. One or more microprocessors are operable for executing instructions contained in main memory 706. Additionally and/or alternatively, hard-wired circuitry may be used in place of, or in combination with the software instructions. Thus, the dimensioner 10 is not limited to any specific combination of circuitry, hardware, firmware, and/or software.

The term "computer readable storage medium," as used herein, may refer to any non-transitory storage medium that participates in providing instructions to the CPU 704 (and the DSP/GPU 744) for execution. Such a medium may take many forms, including but not limited to, non-volatile media, volatile media, and transmission media. Non-volatile media comprises, for example, configured/programmed active elements of the CPU 704, the DSP/GPU 744, the non-transitory stored dimensioner instructions 755 and other optical, electronic, or magnetic disks, such as storage device 710. Volatile media comprises dynamic memory associated, e.g., with the RAM 706.

Transmission media comprises coaxial cables, copper wire and other electrical conductors and fiber optics, including the wires (and/or other conductors or optics) that comprise the data bus 702.

Transmission media can also take the form of electromagnetic radiation (e.g., light waves), such as may be generated at RFs, microwave, and infrared (IR) and/or other optical frequencies. Data communications may also be effectuated using other means, including acoustic (e.g., sound related), ultrasonic or other mechanical, vibrational, or related media.

Non-transitory computer-readable storage media may comprise, for example, flash drives such as may be accessible via universal serial bus (USB) or any medium from which a computer can read data.

Various forms of non-transitory computer readable storage media may be involved in carrying one or more sequences of one or more instructions to CPU 704 for execution. For example, the instructions may initially be carried on a magnetic or other disk of a remote computer (e.g., computer 798). The remote computer can load the instructions into its dynamic memory and send the instructions over networks 728.

The dimensioner 10 can receive the data over the network 728 and use an IR, RF or other transmitter means to convert the data to corresponding signals. An IR, RF or other signal detector or receiver ("receiver") coupled to the data bus 702 can receive the data carried in the corresponding signals and place the data on data bus 702. The operations associated with the transmitter and the receiver may be combined in a transmitter/receiver (transceiver) means. The transmitter, receiver, and/or transceiver means may be associated with the interfaces 718.

The data bus 702 carries the data to main memory 706, from which CPU 704 and the DSP/GPU 744 retrieve and execute the instructions. The instructions received by main memory 706 may optionally be stored on storage device 710 either before or after execution by CPU 704.

The interfaces 718 may comprise a communication interface coupled to the data bus 702. In addition to interfacing audio signals between the data bus 702 and the audio transducers 727, the communication interface is also operable for providing a two-way (or more) data communication coupling to a network link 720, which may connect wirelessly at radio frequencies (RF) to the network 728. Wireless communication may also be implemented optically, e.g., at IR frequencies.

In any implementation, the communication interface 718 sends and receives electrical, electromagnetic, or optical signals that carry digital data streams representing various types of information. The network link 720 provides data communication through the network 728 to other data devices. The communication interfaces 718 may also provide audio signals to the speaker 727.

The network 728 may use one or more of electrical, electromagnetic, and/or optical signals carrying digital data streams. The signals sent over the network 728 and through the network link 720 and communication interface 718 carry the digital data to and from the dimensioner 10. The dimensioner 10 can send messages and receive data, including program code, through the network 728, network link 720, and communication interface 718.

Example embodiments of the present invention are thus described in relation to dimensioning 3D items. A FOV is mapped over three spatial dimensions, each of the three spatial dimensions oriented orthogonally in relation to each of the other spatial dimensions and graduated according to a linear scale. The 3D item is scanned relative to the mapped FOV. Each of the 2D surfaces of the scanned 3D item is identified. A dimension is measured for each of the identified 2D surfaces of the scanned 3D item. A perspective-corrected representation of the measured dimension is rendered, in real time or near real time, with respect to the measuring the dimension step, onto each of the identified 2D surfaces of the scanned 3D item.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;

U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;

U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Indicia-reader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);
U.S. patent application Ser. No. 14/165,980 for System and Method for Measuring Irregular Objects with a Single Camera filed Jan. 28, 2014 (Li et al.);
U.S. patent application Ser. No. 14/166,103 for Indicia Reading Terminal Including Optical Filter filed Jan. 28, 2014 (Lu et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 14/250,923 for Reading Apparatus Having Partial Frame Operating Mode filed Apr. 11, 2014, (Deng et al.);
U.S. patent application Ser. No. 14/257,174 for Imaging Terminal Having Data Compression filed Apr. 21, 2014, (Barber et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/274,858 for Mobile Printer with Optional Battery Accessory filed May 12, 2014 (Marty et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTI-FUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

Example embodiments of the present invention have thus been described in relation to dimensioning 3D items. A FOV is mapped over three spatial dimensions, each of the three spatial dimensions oriented orthogonally in relation to each of the other spatial dimensions and graduated according to a linear scale. The 3D item is scanned relative to the mapped FOV. Each of the 2D surfaces of the scanned 3D item is identified. A dimension is measured for each of the identified 2D surfaces of the scanned 3D item. A perspective-corrected representation of the measured dimension is rendered, in real time or near real time, with respect to the measuring of the dimension, onto each of the identified 2D surfaces of the scanned 3D item.

For clarity and brevity, as well as to avoid unnecessary or unhelpful obfuscating, obscuring, obstructing, or occluding more salient features of an example embodiment, certain intricacies and details, which are known generally to artisans of ordinary skill in related technologies, may have been omitted or discussed in less than exhaustive detail. Any such omissions or discussions do not affect the descriptions of example embodiments herein, and are not particularly relevant to understanding significant features, functions, and aspects of the example embodiments described herein.

In the specification and/or figures, example embodiments of the invention have been described. The present invention is not limited to such example embodiments. The use of the term "and/or" includes any and all combinations of one or more of the associated listed items. The figures are schematic representations and so are not necessarily drawn to

What is claimed, is:

1. A computer implemented method for dimensioning a three dimensional (3D) item, the method comprising the steps of:
mapping a field of view (FOV) over three spatial dimensions, each of the three spatial dimensions oriented orthogonally in relation to each of the others and graduated according to a linear scale;
scanning the 3D item relative to the mapped FOV;
identifying each of a plurality of two dimensional (2D) surfaces of the scanned 3D item;
measuring a dimension of each of the identified 2D surfaces of the scanned 3D item; and
rendering a perspective-corrected representation of the measured dimension, in real time, with respect to the measuring the dimension step, onto each of the identified 2D surfaces of the scanned 3D item;
wherein the identifying each of the 2D surfaces of the scanned 3D item comprises:
detecting each of the 2D surfaces of the scanned 3D item; and
orienting each of the detected 2D surface of the scanned 3D item in relation to the three spatial dimensions of the mapped FOV; and
wherein the rendering the perspective-corrected representation of the measured dimension comprises:
computing an incident angle and a normal angle, based on the orienting the detected 2D surface of the scanned 3D item in relation to the at least two spatial dimensions of the mapped FOV, for a projection of the rendering of the measured dimension onto the identified 2D surface of the scanned 3D item;
computing a translation matrix for translating the projection of the rendering in an alignment with the computed normal angle;
texture mapping a model of the scanned 3D item, the texture mapped model disposed within a virtual 3D space corresponding, and scaled in relation, to the mapped FOV, wherein the detected 2D surface of the scanned item is modeled within the 3D space based on the orienting step; and
projecting the rendered representation of the measured dimension onto the identified 2D surface of the scanned 3D item based on the texture mapped model.

2. The method as described in claim 1, wherein the projecting the rendering of the measured dimension onto the identified 2D surface of the scanned 3D item based on the texture mapped model comprises:
computing a projection of the texture mapped model from a perspective corresponding to the scanning and the rendering; and
performing the projecting of the rendered representation based on the computed projection, wherein an illusion is created of a plurality of individual projections, each of which is rendered onto a corresponding 2D surface of the 3D item with a perspective that appears projected in alignment with the normal angle computed in relation thereto.

3. The method as described in claim 1, further comprising the steps of:
delineating a location for a positioning of the 3D item for a performance of the scanning step;
positioning the 3D item in the delineated position; and
initiating the scanning step upon the positioning of the 3D item in the delineated position.

4. The method as described in claim 3, further comprising the step of detecting the positioning the 3D item in the delineated position, wherein the initiating of the scanning step is automatically performed upon the detecting of the positioning.

5. The method as described in claim 3 wherein the delineated position corresponds with a scale, which is operable for detecting a weight of the 3D item, the method further comprising detecting the weight of the 3D item wherein the rendering the perspective-corrected representation comprises rendering the detected weight, in real time with respect to the rendering of the measured dimension, onto at least one of the identified 2D surfaces of the 3D item.

6. The method as described in claim 5, further comprising the step of computing a volume of the 3D object based on the measured dimension of each of the identified 2D surfaces thereof, wherein the rendering the perspective-corrected representation comprises rendering the computed volume, in real time with respect to the rendering of the measured dimension, onto at least one of the identified 2D surfaces of the 3D item.

7. The method as described in claim 6, further comprising computing a fee relating to shipping the 3D item or storing the 3D item based on one or more of the measured dimension, the computed volume, or the detected weight of the 3D item.

8. The method as described in claim 1, further comprising the step of capturing an image of the scanned 3D item in real time with respect to the rendering the representation step, the captured image comprising the representation of the measured dimension rendered with the corrected perspective on each of the identified 2D surfaces of the scanned 3D item.

9. A system operable for dimensioning a three dimensional (3D) item, the system comprising:
a dimensioner component operable for:
mapping a field of view (FOV) over three spatial dimensions, each of the three spatial dimensions oriented orthogonally in relation to each of the others and graduated according to a linear scale;
scanning the 3D item relative to the mapped FOV;
identifying each of a plurality of two dimensional (2D) surfaces of the scanned 3D item; and
measuring a dimension of each of the identified 2D surfaces of the scanned 3D item; and
a projector component communicatively coupled to the dimensioner component and operable therewith for rendering a perspective-corrected representation of the measured dimension, in real time, with respect to the measuring the dimension step, onto each of the identified 2D surfaces of the scanned 3D item;
wherein the dimensioner component is operable for the identifying each of the 2D surfaces of the scanned 3D item with a process comprising the steps of:
detecting each of the 2D surfaces of the scanned 3D item; and
orienting each of the detected 2D surface of the scanned 3D item in relation to the three spatial dimensions of the mapped FOV; and
wherein the dimensioner component and the projector component are operable together for the rendering of the perspective-corrected representation of the measured dimension with a process comprising the steps of:
computing an incident angle and a normal angle, based on the orienting the detected 2D surface of the scanned 3D item in relation to the at least two spatial dimensions of the mapped FOV, for a projection of the rendering of the measured dimension onto the identified 2D surface of the scanned 3D item;

computing a translation matrix for translating the projection of the rendering in an alignment with the computed normal angle;

texture mapping a model of the scanned 3D item, the texture mapped model disposed within a virtual 3D space corresponding, and scaled in relation, to the mapped FOV, wherein the detected 2D surface of the scanned item is modeled within the 3D space based on the orienting step; and projecting the rendered representation of the measured dimension onto the identified 2D surface of the scanned 3D item based on the texture mapped model.

10. The system as described in claim 9, wherein the projecting the rendering of the measured dimension onto the identified 2D surface of the scanned 3D item based on the texture mapped model step comprises:

computing a projection of the texture mapped model from a perspective corresponding to the scanning and the rendering; and performing the projecting of the rendered representation based on the computed projection, wherein an illusion is created of a plurality of individual projections, each of which is rendered onto a corresponding 2D surface of the 3D item with a perspective that appears projected in alignment with the normal angle computed in relation thereto.

11. The system as described in claim 9, wherein the projector component is further operable for:

delineating a location for a positioning of the 3D item for a performance of the scanning step;

positioning the 3D item in the delineated position; and initiating the scanning step upon the positioning of the 3D item in the delineated position.

12. The system as described in claim 11, further comprising:

a detector component operable for detecting the positioning the 3D item in the delineated position, wherein the initiating of the scanning is performed upon the detecting of the positioning; and a scale component operable for detecting a weight of the 3D item wherein a working surface of the scale is positioned at the delineated position, and wherein the rendering the perspective-corrected representation comprises rendering the detected weight, in real time with respect to the rendering of the measured dimension, onto at least one of the identified 2D surfaces of the 3D item.

13. The system as described in claim 12, wherein the dimensioner is further operable for computing a volume of the 3D object based on the measured dimension of each of the identified 2D surfaces thereof, wherein the projector component is further operable for rendering a representation of the computed volume, in real time with respect to the rendering of the measured dimension, onto at least one of the identified 2D surfaces of the 3D item.

14. The system as described in claim 13, further comprising a camera component operable for capturing an image of the scanned 3D item in real time with respect to the rendering the representation step, the captured image comprising the representation of the measured dimension rendered with the corrected perspective on each of the identified 2D surfaces of the scanned 3D item.

15. The system as described in claim 14, further comprising a processor component operable for computing a fee relating to shipping the 3D item or storing the 3D item based on one or more of the measured dimension, the computed volume, the detected weight, or the captured image of the 3D item.

16. A non-transitory computer readable storage medium comprising instructions operable for causing one or more processors to perform, execute, or control a process for imaging a three dimensional (3D) item, the process comprising the steps of:

mapping a field of view (FOV) over three spatial dimensions, each of the three spatial dimensions oriented orthogonally in relation to each of the others and graduated according to a linear scale;

scanning the 3D item relative to the mapped FOV;

identifying each of a plurality of two dimensional (2D) surfaces of the scanned 3D item;

measuring a dimension of each of the identified 2D surfaces of the scanned 3D item; and rendering a perspective-corrected representation of the measured dimension, in real time, with respect to the measuring the dimension step, onto each of the identified 2D surfaces of the scanned 3D item;

wherein the identifying each of the 2D surfaces of the scanned 3D item comprises:

detecting each of the 2D surfaces of the scanned 3D item; and orienting each of the detected 2D surface of the scanned 3D item in relation to the three spatial dimensions of the mapped FOV; and wherein the rendering the perspective-corrected representation of the measured dimension comprises:

computing an incident angle and a normal angle, based on the orienting the detected 2D surface of the scanned 3D item in relation to the at least two spatial dimensions of the mapped FOV, for a projection of the rendering of the measured dimension onto the identified 2D surface of the scanned 3D item;

computing a translation matrix for translating the projection of the rendering in an alignment with the computed normal angle;

texture mapping a model of the scanned 3D item, the texture mapped model disposed within a virtual 3D space corresponding, and scaled in relation, to the mapped FOV, wherein the detected 2D surface of the scanned item is modeled within the 3D space based on the orienting step; and projecting the rendered representation of the measured dimension onto the identified 2D surface of the scanned 3D item based on the texture mapped model.

* * * * *